US010810719B2

(12) United States Patent
Arakawa et al.

(10) Patent No.: US 10,810,719 B2
(45) Date of Patent: Oct. 20, 2020

(54) FACE IMAGE PROCESSING SYSTEM, FACE IMAGE PROCESSING METHOD, AND FACE IMAGE PROCESSING PROGRAM

(71) Applicants: MEIJI UNIVERSITY, Tokyo (JP);
KOSE CORPORATION, Tokyo (JP)

(72) Inventors: Kaoru Arakawa, Tokyo (JP);
Fumihiko Tsukiyama, Tokyo (JP)

(73) Assignees: MEIJI UNIVERSITY, Tokyo (JP);
KOSE CORPORATION, Tokyo (JP)

(*) Notice: Subject to any disclaimer, the term of this patent is extended or adjusted under 35 U.S.C. 154(b) by 90 days.

(21) Appl. No.: 16/314,210

(22) PCT Filed: Jun. 23, 2017

(86) PCT No.: PCT/JP2017/023264
§ 371 (c)(1),
(2) Date: Dec. 28, 2018

(87) PCT Pub. No.: WO2018/003711
PCT Pub. Date: Jan. 4, 2018

(65) Prior Publication Data
US 2019/0244334 A1    Aug. 8, 2019

(30) Foreign Application Priority Data

Jun. 30, 2016 (JP) .................................. 2016-129615

(51) Int. Cl.
*G06T 5/50* (2006.01)
*G06T 7/00* (2017.01)
(Continued)

(52) U.S. Cl.
CPC ............ *G06T 5/50* (2013.01); *G06K 9/00281* (2013.01); *G06T 1/00* (2013.01); *G06T 5/005* (2013.01);
(Continued)

(58) Field of Classification Search
CPC .. G06T 5/507; G06T 7/50; G06T 7/90; G06T 7/70; G06T 1/00; G06T 5/005;
(Continued)

(56) References Cited

U.S. PATENT DOCUMENTS 7,027,621 B1 * 4/2006 Prokoski ............ G06K 9/00248
180/272
7,058,209 B2 * 6/2006 Chen ................... G06K 9/00281
382/117

(Continued)

FOREIGN PATENT DOCUMENTS

JP    2001-118064 A    4/2001
JP    2005-196270 A    7/2005
(Continued)

OTHER PUBLICATIONS

Arakawa et al; "ε-Seperating Nonlinear Filter Bank and Its Application to Face Image Beautification;" vol. J88-A; No. 11; pp. 1215-1225.
(Continued)

*Primary Examiner* — Charles L Beard
(74) *Attorney, Agent, or Firm* — Oliff PLC

(57) ABSTRACT

A face image processing system includes: a component extracting means which receives an input of face image information indicating a face image, and extracts a wrinkle component, a fleck component and a pore component of the face image from the face image information; a removal rate adjusting means which adjusts a removal rate of each of the wrinkle component, the fleck component and the pore component extracted by the component extracting means; a storage means which stores the removal rate; a synthesizing means which synthesizes the wrinkle component, the fleck component and the pore component which are amplified or attenuated at the removal rate adjusted by the removal rate adjusting means, and generates a face image; and an output
(Continued)

means which outputs the face image information synthesized by the synthesizing means.

20 Claims, 12 Drawing Sheets

(51) Int. Cl.
| | |
|---|---|
| *G06T 1/00* | (2006.01) |
| *G06T 7/50* | (2017.01) |
| *G06T 7/90* | (2017.01) |
| *G06T 7/70* | (2017.01) |
| *G06K 9/00* | (2006.01) |
| *G06T 5/00* | (2006.01) |
| *G06T 11/00* | (2006.01) |
| *G06F 3/0482* | (2013.01) |

(52) U.S. Cl.
CPC .............. *G06T 7/00* (2013.01); *G06T 7/50* (2017.01); *G06T 7/70* (2017.01); *G06T 7/90* (2017.01); *G06T 11/001* (2013.01); *G06F 3/0482* (2013.01); *G06T 2200/24* (2013.01); *G06T 2207/20024* (2013.01); *G06T 2207/20221* (2013.01); *G06T 2207/30088* (2013.01); *G06T 2207/30201* (2013.01)

(58) Field of Classification Search
CPC ..... G06T 7/00; G06T 11/001; G06T 2200/24; G06T 2207/20024; G06T 2207/20221; G06T 2207/30088; G06T 2207/30201; G06K 9/00281; G06F 3/0482
See application file for complete search history.

(56) References Cited

U.S. PATENT DOCUMENTS

| | | | | |
|---|---|---|---|---|
| 8,073,206 | B2 * | 12/2011 | Kamiyama | H04N 7/181 348/143 |
| 8,073,287 | B1 * | 12/2011 | Wechsler | G06K 9/746 359/306 |
| 8,094,186 | B2 * | 1/2012 | Fukuoka | A61B 5/442 348/77 |
| 8,131,029 | B2 * | 3/2012 | Chhibber | G06K 9/00288 382/118 |
| 9,105,088 | B1 * | 8/2015 | Petrie | G06T 5/002 |
| 9,235,782 | B1 * | 1/2016 | Zomet | G06K 9/00281 |
| 9,317,970 | B2 * | 4/2016 | Beeler | G06T 19/00 |
| 9,552,510 | B2 * | 1/2017 | Li | G06K 9/00315 |
| 9,842,358 | B1 * | 12/2017 | Butler | G06Q 30/0631 |
| 9,898,648 | B2 * | 2/2018 | Oh | G06K 9/00288 |
| 10,503,970 | B1 * | 12/2019 | Zhang | A61B 5/1176 |
| 2002/0012454 | A1 * | 1/2002 | Liu | G06K 9/00281 382/118 |
| 2003/0063102 | A1 * | 4/2003 | Rubinstenn | A61B 5/1034 345/619 |
| 2003/0063801 | A1 * | 4/2003 | Rubinstenn | A45D 44/005 382/190 |
| 2004/0008874 | A1 * | 1/2004 | Koike | G06Q 10/10 382/118 |
| 2004/0028263 | A1 * | 2/2004 | Sakamoto | A61B 5/0071 382/128 |
| 2004/0218810 | A1 * | 11/2004 | Momma | A61B 5/0064 382/162 |
| 2005/0058369 | A1 * | 3/2005 | Sanse | B42D 25/309 382/282 |
| 2005/0129331 | A1 * | 6/2005 | Kakiuchi | G06T 7/90 382/275 |
| 2005/0169520 | A1 * | 8/2005 | Chen | G06T 7/0012 382/165 |
| 2005/0271295 | A1 * | 12/2005 | Tabata | G06T 5/002 382/274 |
| 2006/0115157 | A1 * | 6/2006 | Mori | G06K 9/00315 382/190 |
| 2006/0188144 | A1 * | 8/2006 | Sasaki | G06T 17/10 382/154 |
| 2007/0127844 | A1 * | 6/2007 | Watanabe | G06K 9/00315 382/276 |
| 2007/0177793 | A1 * | 8/2007 | Gu | G06K 9/00281 382/159 |
| 2007/0242856 | A1 * | 10/2007 | Suzuki | G06K 9/4628 382/103 |
| 2008/0270175 | A1 * | 10/2008 | Rodriguez | G06Q 50/22 705/2 |
| 2008/0317378 | A1 * | 12/2008 | Steinberg | H04N 5/2171 382/275 |
| 2009/0003708 | A1 * | 1/2009 | Steinberg | H04N 5/2621 382/190 |
| 2009/0060291 | A1 * | 3/2009 | Ohtani | G06K 9/00281 382/118 |
| 2009/0132371 | A1 * | 5/2009 | Strietzel | G06Q 30/0247 705/14.46 |
| 2009/0196475 | A1 * | 8/2009 | Demirli | A61B 5/441 382/128 |
| 2009/0280150 | A1 * | 11/2009 | Kamen | A45D 44/002 424/401 |
| 2010/0029564 | A1 * | 2/2010 | Strohbehn | C07K 1/12 514/2.4 |
| 2010/0054592 | A1 * | 3/2010 | Nanu | H04N 5/23219 382/167 |
| 2010/0166331 | A1 * | 7/2010 | Chan | G06T 5/002 382/254 |
| 2010/0228180 | A1 * | 9/2010 | Jayes | A61N 1/0436 604/20 |
| 2010/0233128 | A1 * | 9/2010 | Panasenko | A61K 8/922 424/93.4 |
| 2010/0316281 | A1 * | 12/2010 | Lefevre | G06T 7/75 382/154 |
| 2011/0002506 | A1 * | 1/2011 | Ciuc | H04N 5/23219 382/103 |
| 2011/0091071 | A1 * | 4/2011 | Sabe | G06K 9/00288 382/103 |
| 2011/0115786 | A1 * | 5/2011 | Mochizuki | G06T 11/001 345/419 |
| 2011/0158536 | A1 * | 6/2011 | Nakano | G06K 9/00281 382/190 |
| 2011/0236493 | A1 * | 9/2011 | Canham | A23P 10/30 424/491 |
| 2011/0249863 | A1 * | 10/2011 | Ohashi | G06K 9/00234 382/103 |
| 2011/0311112 | A1 * | 12/2011 | Matsuyama | G06K 9/00281 382/118 |
| 2012/0044335 | A1 * | 2/2012 | Goto | G06T 11/00 348/77 |
| 2012/0070102 | A1 * | 3/2012 | Yokokawa | H04N 5/23222 382/286 |
| 2012/0299945 | A1 * | 11/2012 | Aarabi | G06T 11/60 345/589 |
| 2012/0328198 | A1 * | 12/2012 | Takahashi | G06K 9/00281 382/195 |
| 2013/0136302 | A1 * | 5/2013 | Nam | G06K 9/00281 382/103 |
| 2013/0169827 | A1 * | 7/2013 | Santos | H04N 5/23229 348/207.1 |
| 2013/0251202 | A1 * | 9/2013 | Auberger | G06K 9/00248 382/103 |
| 2013/0329079 | A1 * | 12/2013 | Florea | H04N 5/2621 348/222.1 |
| 2014/0079319 | A1 * | 3/2014 | Lin | G06T 5/007 382/167 |
| 2014/0105487 | A1 * | 4/2014 | Irie | G06K 9/66 382/159 |
| 2014/0140624 | A1 * | 5/2014 | Kasahara | G06K 9/00248 382/195 |
| 2014/0204191 | A1 * | 7/2014 | Takai | G06K 9/00671 348/77 |
| 2014/0254939 | A1 * | 9/2014 | Kimura | G06K 9/00302 382/201 |

(56) References Cited

U.S. PATENT DOCUMENTS

| | | | |
|---|---|---|---|
| 2015/0049111 A1* | 2/2015 | Yamanashi | A45D 44/005 345/632 |
| 2015/0346936 A1* | 12/2015 | Rodan | G06F 3/0484 715/745 |
| 2015/0381938 A1* | 12/2015 | Cunico | G06K 9/6202 348/14.1 |
| 2016/0065861 A1* | 3/2016 | Steinberg | G06K 9/00268 348/239 |
| 2016/0106198 A1* | 4/2016 | Yoshida | G01N 21/27 356/402 |
| 2016/0125228 A1* | 5/2016 | Son | G06K 9/00281 382/118 |
| 2016/0135730 A1* | 5/2016 | Arai | A61B 5/0077 600/306 |
| 2016/0156840 A1* | 6/2016 | Arai | H04N 5/2256 348/77 |
| 2016/0162728 A1* | 6/2016 | Arai | G06K 9/4609 382/118 |
| 2016/0171321 A1* | 6/2016 | Ohsuga | A61B 5/168 345/419 |
| 2016/0357578 A1* | 12/2016 | Kim | A45D 44/005 |
| 2016/0364602 A1* | 12/2016 | Kim | G06T 15/50 |
| 2017/0345144 A1* | 11/2017 | Pai | G06F 19/321 |
| 2018/0068171 A1* | 3/2018 | Jones | A61B 5/0013 |
| 2018/0085048 A1* | 3/2018 | Lee | G06K 9/00268 |
| 2018/0206616 A1* | 7/2018 | Alary | B33Y 80/00 |
| 2018/0308276 A1* | 10/2018 | Cohen | G06T 15/205 |
| 2018/0325804 A1* | 11/2018 | Park | A61K 8/66 |
| 2019/0026586 A1* | 1/2019 | Liu | G01J 3/0264 |
| 2019/0080149 A1* | 3/2019 | Gernoth | G06K 9/00926 |
| 2019/0098149 A1* | 3/2019 | Shinoda | G06K 9/00281 |
| 2019/0163965 A1* | 5/2019 | Yoo | G06K 9/00281 |
| 2019/0213452 A1* | 7/2019 | Ludwinski | G06T 7/0012 |
| 2019/0236339 A1* | 8/2019 | Komatsuzaki | G06K 9/00255 |
| 2019/0244408 A1* | 8/2019 | Nishi | A45D 44/005 |
| 2019/0251336 A1* | 8/2019 | Wu | G06K 9/6217 |
| 2019/0279347 A1* | 9/2019 | Hayasaka | G06T 5/50 |
| 2019/0279410 A1* | 9/2019 | Orvalho | G06F 3/167 |
| 2019/0295302 A1* | 9/2019 | Fu | G06N 3/0454 |
| 2019/0340780 A1* | 11/2019 | Hiraide | G06F 3/015 |
| 2019/0366119 A1* | 12/2019 | Kim | A61B 5/443 |
| 2020/0005435 A1* | 1/2020 | Tajima | G06T 7/44 |
| 2020/0020173 A1* | 1/2020 | Sharif | G06T 17/00 |
| 2020/0042769 A1* | 2/2020 | Yan | G06T 7/20 |
| 2020/0042820 A1* | 2/2020 | Zavalishin | G06T 15/50 |
| 2020/0043213 A1* | 2/2020 | Bao | G06K 9/00281 |
| 2020/0074199 A1* | 3/2020 | Tseng | A61B 5/103 |
| 2020/0082158 A1* | 3/2020 | Hussain | G06T 11/001 |
| 2020/0082201 A1* | 3/2020 | Kim | G06T 15/50 |
| 2020/0143147 A1* | 5/2020 | Matsumoto | G06K 9/00281 |

FOREIGN PATENT DOCUMENTS

| | | |
|---|---|---|
| JP | 2006-53821 A | 2/2006 |
| JP | 2006-53852 A | 2/2006 |
| JP | 4682373 B | 5/2011 |
| JP | 4768869 B | 9/2011 |
| JP | 2012-238135 A | 12/2012 |
| JP | 2015-80647 A | 4/2015 |

OTHER PUBLICATIONS

Sep. 26, 2017 International Search Report issued in International Patent Application No. PCT/JP2017/023264.

Arakawa et al; "ε-Separating Nonlinear Filter Bank and Its Application to Face Image Beautification;" vol. J88-A; No. 11; pp. 1215-1225.

* cited by examiner

FACE IMAGE PROCESSING SYSTEM, FACE IMAGE PROCESSING METHOD, AND FACE IMAGE PROCESSING PROGRAM

TECHNICAL FIELD

The present invention relates to a face image processing system, a face image processing method and a face image processing program which receive an input of face image information, performs image processing on the face image information and outputs the face image information.

BACKGROUND ART

There is a known face image synthesizing device which receives an input of face image information indicating a face image of a person, performs image processing on this face image information and outputs the face image processed to look differently from an actual face image (see, for example, Patent Literature 1). This face image synthesizing device performs, for example, the image processing as follows.

The face image synthesizing device detects flecks or wrinkles from face images of a plurality of people, generates age shape features corresponding to ages or an age group, and creates a fleck model or a wrinkle model corresponding to the age or the age group from the flecks or the wrinkles of a plurality of people. On the other hand, a face shape without a fleck or a wrinkle is extracted from a face image of a subject, and this face shape is deformed based on the age shape features.

Furthermore, the fleck model or the wrinkle model corresponding to the age or the age group designated among the fleck model or the wrinkle model is deformed to match with a deformed face shape, and this deformed fleck model or wrinkle model is applied to the face image of the subject. According to this processing, it is possible to manipulate an age to a face shape corresponding to an age or an age group to which the face shape of the subject is designated, and manipulate the age of the face image of the subject to a natural face image corresponding to a desired age or age group.

CITATION LIST

Patent Literature

Patent Literature 1: JP 4682373 B2

SUMMARY OF INVENTION

Technical Problem

However, the face image synthesizing device according to the above conventional technique synthesizes a face image by applying the age shape feature, the fleck model or the wrinkle model created based on the face images of a plurality of people to the face shape without flecks and wrinkles extracted from the face image of the subject. Therefore, an ideal natural face image purely pursued by the subject is hardly provided.

The present invention has been made in light of the above situation. An object of the present invention is to provide a face image processing system, a face image processing method and a face image processing program which can freely generate a more natural face image which is ideal for a subject.

Solution to Problem

A face image processing system according to the present invention includes: a component extracting means which receives an input of face image information indicating a face image, and extracts a wrinkle component, a fleck component and a pore component of the face image from the face image information; a removal rate adjusting means which adjusts a removal rate of each of the wrinkle component, the fleck component and the pore component extracted by the component extracting means; a storage means which stores the removal rate; a synthesizing means which synthesizes the wrinkle component, the fleck component and the pore component which are amplified or attenuated at the removal rate adjusted by the removal rate adjusting means, and generates a face image; and an output means which outputs the face image information synthesized by the synthesizing means.

According to one embodiment of the present invention, the face image processing system further includes a face region extracting means which extracts the face image indicating a face region from which at least one of an eye region, a nose region and a mouth region of an input face image included in inputted image information has been removed.

According to another embodiment of the present invention, the component extracting means includes a filter means which divides the face image information indicating the inputted face image into a first component, a second component, a third component, a fourth component and a fifth component in an amplitude-frequency space, and extracts the fourth component, and a component recognizing means which recognizes the wrinkle component, the fleck component and the pore component in the face image based on the fourth component extracted by the filter means, and distinguishes an appearance position and a shape of each component in the face image.

According to a still another embodiment of the present invention, the removal rate adjusting means adjusts the removal rate of each of the components in the face image by weighting the wrinkle component, the fleck component and the pore component.

According to a still another embodiment of the present invention, the synthesizing means synthesizes the fourth component corresponding to the wrinkle component, the fleck component and the pore component based on the removal rate stored in the storage means, and the first component, the second component, the third component and the fifth component divided by the filter means. Alternatively, the synthesizing means can synthesize the wrinkle component, the fleck component and the pore component based on the removal rate stored in the storage means, and the inputted face image information (input face image information $x(n)$).

According to a still another embodiment of the present invention, the face image processing system further includes, at a subsequent stage of the synthesizing means, a face color processing means that includes: a skin color extracting means which extracts a skin color region of which at least one of a luminance and color information of the face image information is in a predetermined range; and a shade adjusting means which changes a shade of a skin color in the skin color region extracted by the skin color extracting means.

According to a still another embodiment of the present invention, a plurality of the face image information outputted from the output means is generated, the output means displays a plurality of candidate face images based on the plurality of generated face image information, on a display screen of a display means, the face image processing system further includes an input means which accepts one of a selection instruction of a desired candidate face image designated by a user and a determination instruction of a final candidate face image from the plurality of displayed candidate face images, and a computing means which, when the input means accepts the selection instruction of the candidate face image, sets a parameter of each processing of the component extracting means, the removal rate adjusting means and the face color processing means based on the face image information indicating the selected candidate face image by interactive evolutionary computation by performing crossover processing and mutation processing based on a genetic algorithm, and the component extracting means, the removal rate adjusting means and the face color processing means repeatedly generate the face image information based on the parameter set by the computing means until the input means accepts the determination instruction of the candidate face image.

According to a still another embodiment of the present invention, when the input means accepts the determination instruction of the candidate face image, the storage means stores as a reference parameter the parameter for generating the face image information indicating a determined candidate face image.

A face image processing method according to the present invention is a face image processing method of a face image processing system including: a component extracting means; a removal rate adjusting means; a storage means; a synthesizing means; and an output means, and comprises: extracting a wrinkle component, a fleck component and a pore component of a face image from face image information indicating an inputted face image by the component extracting means; adjusting a removal rate of each of the extracted wrinkle component, fleck component and pore component by the removal rate adjusting means; storing the removal rate by the storage means; synthesizing the wrinkle component, the fleck component and the pore component which are amplified or attenuated at the removal rate adjusted in the step of adjusting the removal rate, and generating the face image by the synthesizing means; and outputting the synthesized face image information by the output means.

A face image processing program according to the present invention is a face image processing program which causes a face image processing system including a computer including a component extracting means, a removal rate adjusting means, a storage means, a synthesizing means, and an output means to execute face image processing, and causes the computer to execute: a step of causing the component extracting means to extract a wrinkle component, a fleck component and a pore component of a face image from face image information indicating the face image inputted; a step of causing the removal rate adjusting means to adjust a removal rate of each of the extracted wrinkle component, fleck component and pore component; a step of causing the storage means to store the removal rate; a step of causing the synthesizing means to synthesize the wrinkle component, the fleck component and the pore component which are amplified or attenuated at the removal rate adjusted in the step of adjusting the removal rate, and generate the face image; and a step of causing the output means to output the synthesized face image information.

Advantageous Effects of Invention

According to the present invention, it is possible to freely generate a more natural face image which is ideal for a subject.

DESCRIPTION OF EMBODIMENTS

A face image processing system, a face image processing method and a face image processing program according to embodiments of the present invention will be described in detail below with reference to the accompanying drawings.

In addition, the following embodiments do not limit the invention according to each claim, all combinations of features described in the embodiments are not necessarily indispensable for a solution of the invention, and most modifications can be achieved by one of ordinary skilled in the art within a range of a technical idea.

Figure 1:
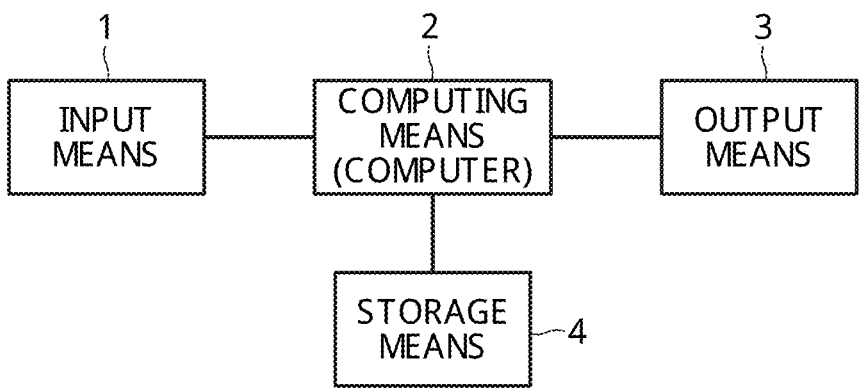
FIG. 1 is a block diagram illustrating an entire configuration of a face image processing system according to a first embodiment of the present invention.
Figure 2:
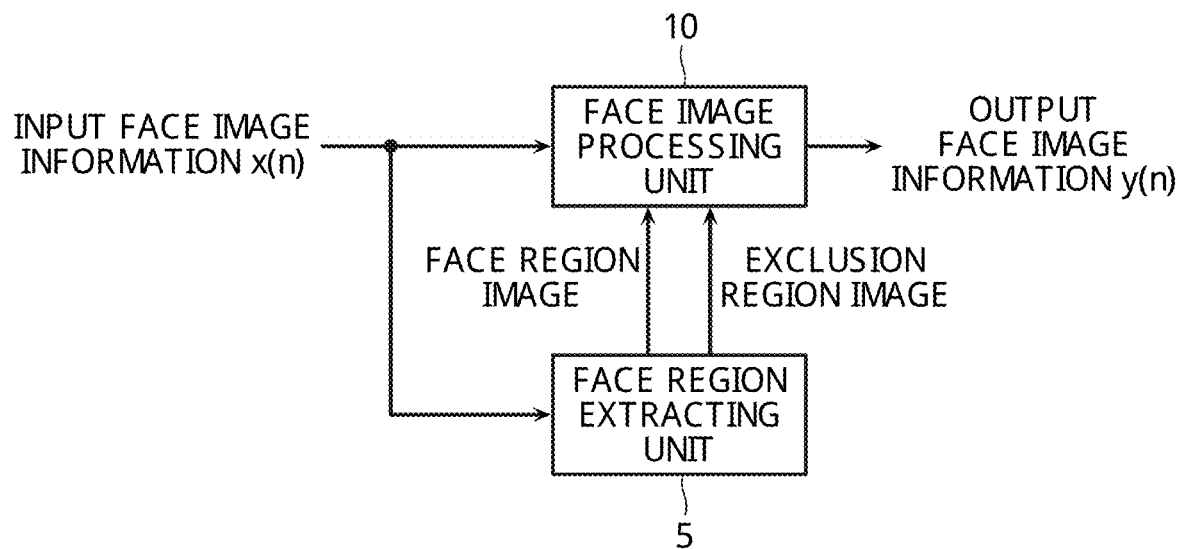
FIG. 2 is a block diagram illustrating a configuration of a computing means of the face image processing system.
Figure 3:
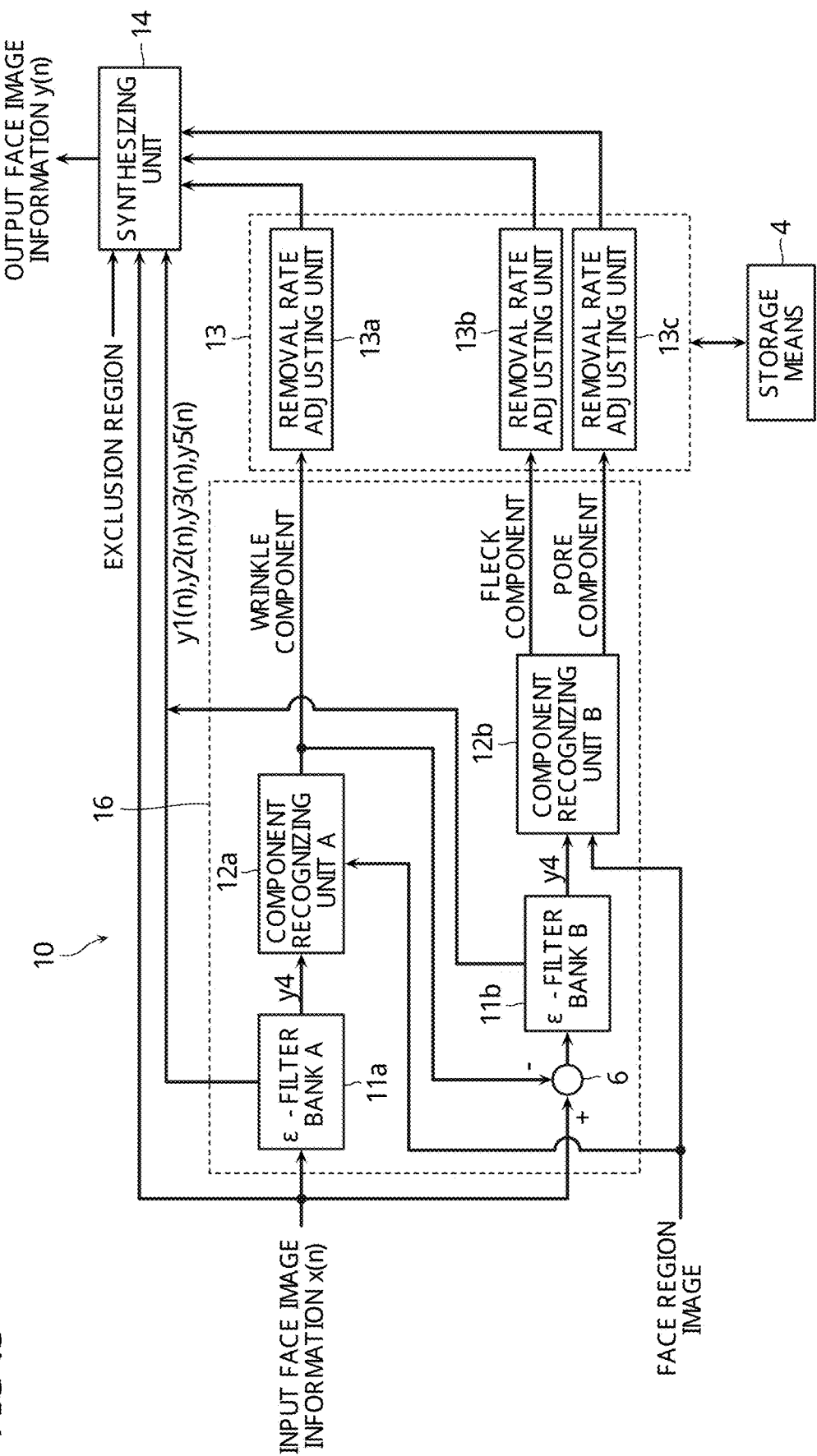
FIG. 3 is a block diagram illustrating an internal configuration of a face image processing unit of the face image processing system.
Figure 4:
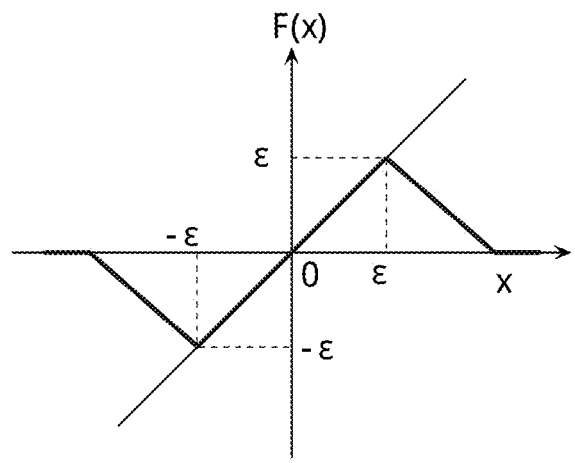
FIG. 4 is a view illustrating an example of a non-linear function of the face image processing unit of the face image processing system.

FIG. 1 is a block diagram illustrating an entire configuration of a face image processing system according to a first embodiment of the present invention. Furthermore, FIG. 2 is a block diagram illustrating a configuration of a computing means of this face image processing system. Furthermore, FIG. 3 is a block diagram illustrating an internal configuration of a face image processing unit of this face image processing system, and FIG. 4 is a view illustrating an example of a non-linear function of this face image processing unit.

As illustrated in FIG. 1, the face image processing system according to the first embodiment is realized on a computing means 2 which is hardware such as a computer or a workstation. Furthermore, the face image processing system includes an input means 1, an output means 3 and a storage means 4. The input means 1 includes input devices such as a keyboard including a plurality of operation keys used to input numerical values, characters or operations such as various instructions, a mouse, a touch panel and a remote controller, and an image input device such as a digital camera or a scanner which obtains and inputs image information.

The output means 3 includes an image output device such as a display which displays various pieces of information and a face image based on face image information on a display screen, and an image printing device which prints and outputs the face image based on the face image information to media. The storage means 4 includes a storage device and a storage medium such as a RAM, a ROM, an SSD, a magnetic disk drive, an optical disk drive and a memory card which store various pieces of information and parameters.

Meanwhile, as illustrated in FIG. 2, the computing means 2 can function as a face region extracting unit 5 which extracts a face image (referred to as a "face region image" below) indicating a face region from which at least one (referred to as an "exclusion region" below) of an eye region, a nose (or nostril) region and a mouth region is excluded from, for example, an input face image indicating a face image (referred to as a "subject face image" below) of a subject (user) included in inputted input face image information x(n). Furthermore, the computing means 2 can function as a face image processing unit 10 which receives an input of the input face image, and this face region image or an exclusion region image (image data) indicating an exclusion region, and performs various types of image processing based on the input face image and the exclusion region image.

First, the face region extracting unit 5 recognizes the subject face image of the subject included in this face image from the input face image of the input face image information x(n). The input face image information x(n) includes, for example, an image format such as BMP, JPEG, GIF, PNG and RAW. For example, an outline detection filter such as a Laplacian filter can be used to recognize a subject face image.

Next, the face region extracting unit 5 recognizes the exclusion regions of the input face image indicating the recognized subject face image by a known face portion feature extraction method, and extracts a face region image from which the exclusion regions are excluded. In addition, all of the eye regions, the nose region and the mouth region are exclusion regions in the present embodiment. Although these exclusion regions can be extracted as wrinkle, fleck and pore components, this is because a face image processing load is reduced by excluding the input face image in advance. In addition, the exclusion regions can be arbitrarily set in addition to the above exclusion regions. Furthermore, the face region extracting unit 5 outputs, for example, the face region image and an exclusion region image to the face image processing unit 10.

In addition, the face region extracting unit 5 is not an indispensable component for the face image processing system, and therefore can be also omitted. In this regard, in a case where the face region extracting unit 5 is omitted, a processing task related to a face image in the face image processing unit 10 at a subsequent stage increases, and a load increases in some cases. Furthermore, even when the face region extracting unit 5 excludes the exclusion region, the face image processing unit 10 may process the face region image and the exclusion region image as illustrated in FIGS. 2 and 3.

As illustrated in FIG. 3, the face image processing unit 10 includes a component extracting unit 16 which extracts a wrinkle component, a fleck component and a pore component of a subject face image based on the inputted input face image and the face region image (and the exclusion region image) from the face region extracting unit 5. Furthermore, the face image processing unit 10 includes a component adjusting unit 13 which includes removal rate adjusting units 13a, 13b and 13c which adjust each removal rate of the wrinkle component, the fleck component and the pore component extracted by this component extracting unit 16.

Furthermore, the face image processing unit 10 includes a synthesizing unit 14 which generates a face image (referred to as an "output face image" below) which is obtained by synthesizing the wrinkle component, the fleck component and the pore component amplified or attenuated at the removal rate adjusted by each of the removal rate adjusting units 13a to 13c of the component adjusting unit 13 with an input face image, structural components of the input face image, predetermined components of the input face image, a face region image or an exclusion region image, and outputs the face image. In addition, the removal rate of each of the removal rate adjusting units 13a to 13c of the component adjusting unit 13 is selected or designated by a subject via the input means 1, and is stored in the storage means 4. This removal rate indicates a rate of an expression (addition or removal) of each component in an amplification direction as a positive value or each component in an attenuation direction as a negative value. Furthermore, output face image information y(n) indicating an output face image synthesized by the synthesizing unit 14 is outputted by the output means 3.

The component extracting unit 16 of the face image processing unit 10 includes an ε-filter bank A11a and an ε-filter bank B11b (which will be collectively referred to as an "ε-filter bank 11" below unless otherwise stated) which are filter means which divide the inputted input face image information (x(n)) into predetermined components in the amplitude-frequency space to extract, and a component recognizing unit A12a and a component recognizing unit B12b (which will be referred to as a "component recognizing unit 12" below unless otherwise stated) which distinguish and recognize the wrinkle component, the fleck component and the pore component of the subject face image based on the predetermined components extracted by this ε-filter bank 11.

The ε-filter bank 11 functions as the filter means, and, more specifically, divides the input face image information x(n) into, for example, a first component (y1(*n*)) and a second component (y2(*n*)) indicating structural components of the face image, and a third component (y3(*n*)), a fourth component (y4(*n*)) and a fifth component (y5(*n*)) indicating predetermined components of a skin of the face image in the amplitude-frequency space.

Furthermore, in the present embodiment, the ε-filter bank 11 extracts the fourth component to output to the component recognizing unit 12, and outputs the first component, the second component, the third component and the fifth component to the synthesizing unit 14. The component recognizing unit 12 recognizes the wrinkle component, the fleck component and the pore component in the subject face image based on the extracted and inputted fourth component, and distinguishes an appearance position and a shape of each of these components in the subject face image.

More specifically, the ε-filter bank A11*a* extracts the fourth component from the input face image information x(n) to output to the component recognizing unit A12*a*. The component recognizing unit A12*a* receives an input of the fourth component and the face region image, recognizes and distinguishes the wrinkle component as described above, and outputs this wrinkle component. Furthermore, the ε-filter bank B11*b* further extracts the fourth component obtained by subtracting the wrinkle component from the component recognizing unit A12*a* from the input face image information x(n) inputted to an adder/subtractor 6 to output to the component recognizing unit B12*b*. The component recognizing unit B12*b* receives an input of the fourth component and the face region image, recognizes and distinguishes the fleck component and the pore component as described above, and outputs these fleck component and pore component.

Furthermore, the removal rate adjusting unit 13*a* of the component adjusting unit 13 at a subsequent stage weights the wrinkle component outputted from the component recognizing unit A12*a*, and adjusts the removal rate of the wrinkle component in the face image. Furthermore, the removal rate adjusting unit 13*b* weights the fleck component outputted from the component recognizing unit B12*b*, and adjusts the removal rate of the fleck component in the face image. Furthermore, the removal rate adjusting unit 13*c* weights the pore component outputted from the component recognizing unit B12*b*, and adjusts the removal rate of the pore component in the face image. In addition, the weighting is an example of a removal rate adjusting method, and therefore is not limited to this. Furthermore, each removal rate adjusted by the component adjusting unit 13 is stored in the storage means 4.

Furthermore, the synthesizing unit 14 receives an input of the first and second components (y1(*n*), y2(*n*)), the third component (y3(*n*)) and the fifth component (y5(*n*)) which are structural components of the face image outputted from the ε-filter bank 11, and/or the input face image information x(n), and receives an input of the wrinkle component, the fleck component and the pore component adjusted to be amplified or attenuated at the removal rate by each of the removal rate adjusting units 13*a* to 13*c* of the component adjusting unit 13 based on the removal rate stored in the storage means 4. Thus, the synthesizing unit 14 can add (synthesize) the inputted first, second, third and fifth components and/or the input face image information x(n), and the wrinkle component, the fleck component and the pore component, and adds (synthesizes), for example, the exclusion region image which has been excluded or the face region image extracted by the face region extracting unit 5 to generate an output face image, and outputs the output face image information y(n) indicating this face image.

In addition, the ε-filter bank 11 is more specifically composed by an ε-separation type non-linear filter bank. Furthermore, the filter means is composed by a filter bank which uses various non-linear filters in addition to the ε-filter bank 11. In this regard, a principal of the ε-filter bank used by the ε-filter bank 11 will be described first.

The face image processing unit 10 of the face image processing system according to the present embodiment uses, for example, input face image information inputted at a time point of n as an input signal x(n) and output face image information to be outputted as an output signal y(n) first. Furthermore, an ε-filter is realized by introducing a non-linear function F to a non-recursive low bandpass filter given by following equation (1), and is given by following equation (2).

[Mathematical 1]

$$y(n) = \sum_{i=-N}^{N} a_i x(n-i) \tag{1}$$

[Mathematical 2]

$$y(n) = x(n) + \sum_{i=-N}^{N} a_i F(x(n+i) - x(n)) \tag{2}$$

In this regard, in above equations (1) and (2), $a_i$ represents a non-recursive low bandpass filter coefficient of which total sum is 1, F represents a non-linear function as illustrated in FIG. 4, and an absolute value of F is limited to a certain value or less. In this case, a difference between the input signal x(n) and the output signal y(n) is limited to a certain value ε' or less as in equation (3) below.

[Mathematical 3]

$$|y(n) - x(n)| = \left| \sum_{i=-N}^{N} a_i F(x(n-i) - x(n)) \right| \leq \sum_{i=-N}^{N} |a_i| \varepsilon \equiv \varepsilon' \tag{3}$$

Furthermore, in this case, when all $a_i$ in particular are positive, ε'=ε holds. When additive high frequency noise of a sufficiently small amplitude is included in an input signal, if ε is set to approximately an amplitude peak/peak value of noise, this noise is smoothed by the low bandpass filter expressed by above equation (1). Furthermore, the output signal is within the input signal ±ε, so that it is possible to cancel noise while keeping a significant amplitude change.

Figure 5:
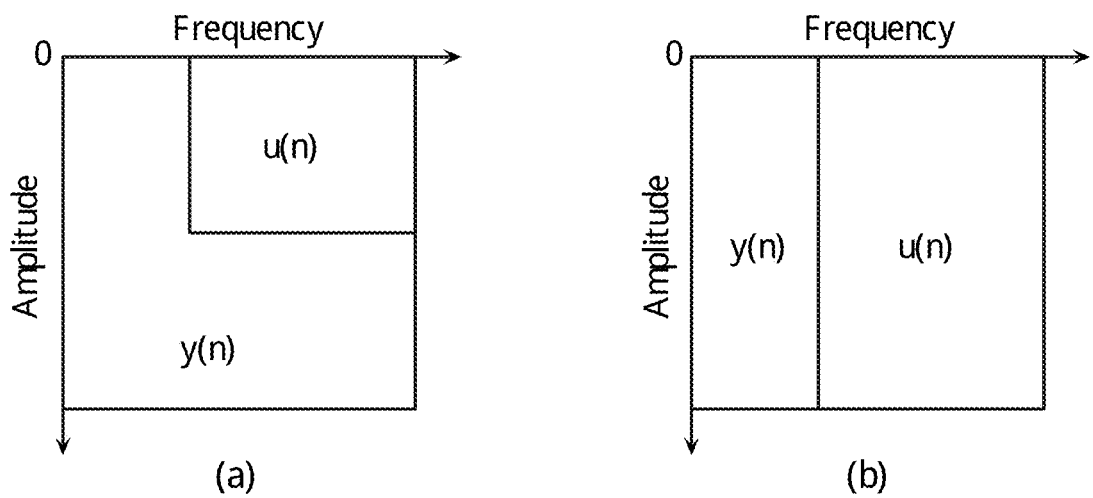
FIG. 5 is a view illustrating a division example of an amplitude-frequency space by an E-filter and a linear low bandpass filter of the face image processing unit of the face image processing system.

FIG. 5 is a view illustrating a division example of an amplitude-frequency space by the ε-filter and the linear low bandpass filter of the face image processing unit of the face image processing system. As illustrated in FIG. 5, this ε-filter can obtain a low frequency component or a large amplitude component as an input of the output signal y(n), and obtain a small amplitude high frequency component equal to or less than an amplitude ε as x(n)-y(n).

Hence, when x(n)-y(n) is expressed as u(n), this ε-filter divides this amplitude-frequency space with respect to the input signal x(n) as illustrated in FIG. 5(*a*). In addition, a normal linear low bandpass filter corresponds to a filter which divides this amplitude-frequency space as illustrated in FIG. 5(*b*).

Figure 6:
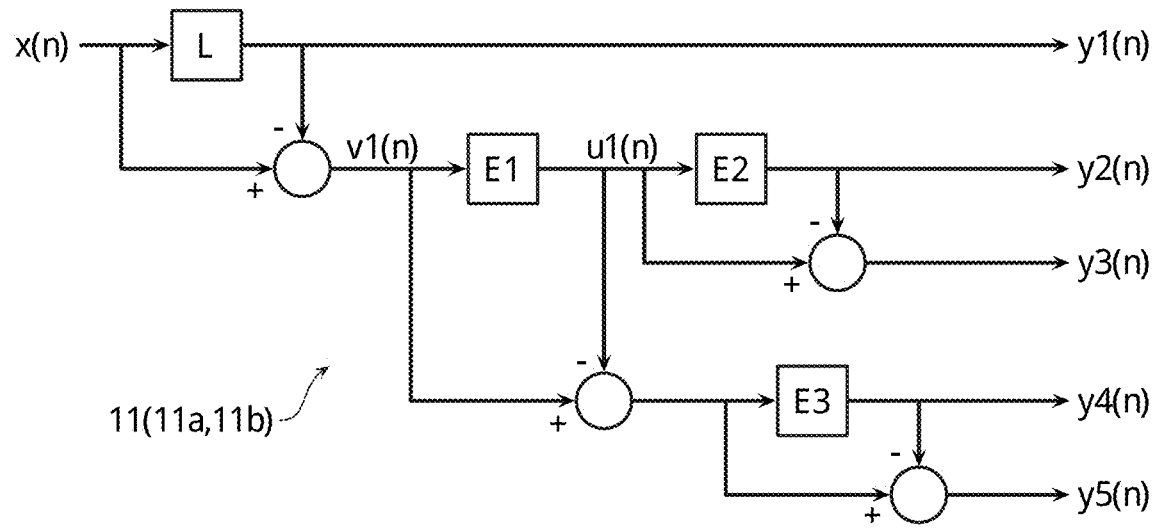
FIG. 6 is a view illustrating a configuration of an E-filter bank of the face image processing unit of the face image processing system.

FIG. 6 is a view illustrating a configuration of the ε-filter bank of the face image processing unit of the face image processing system. A combination of the above ε-filters in a filter bank shape makes it possible to divide this input signal x(n) into a plurality of regions according to an amplitude-frequency. In this regard, as illustrated in FIG. 6, the ε-filter bank 11 (11a and 11b) adopts a structure which is a combination of a linear low bandpass filter and a ε-filter.

In this ε-filter bank 11, L illustrated in FIG. 6 represents a linear low bandpass filter, and E1, E2 and E3 represent ε-filters. Each of these filters is a two-dimensional filter or a combination of horizontal/vertical direction one-dimensional filters, and n represents a pixel position (i, j) on a two-dimensional plane.

In addition, a total sum of output signals y1(n), y2(n), y3(n), y4(n) and y5(n) can be equal to the input signal x(n), and window sizes of a linear low bandpass filter L and the ε-filter E2 can be equally w0, and window sizes of the ε-filters E1 and E3 can be also equally w1. Furthermore, a value ε of each of the ε-filters E1, E2 and E3 (which are ε1, ε2 and ε3 in order) can have a relationship of ε1>ε2>ε3.

Figure 7:
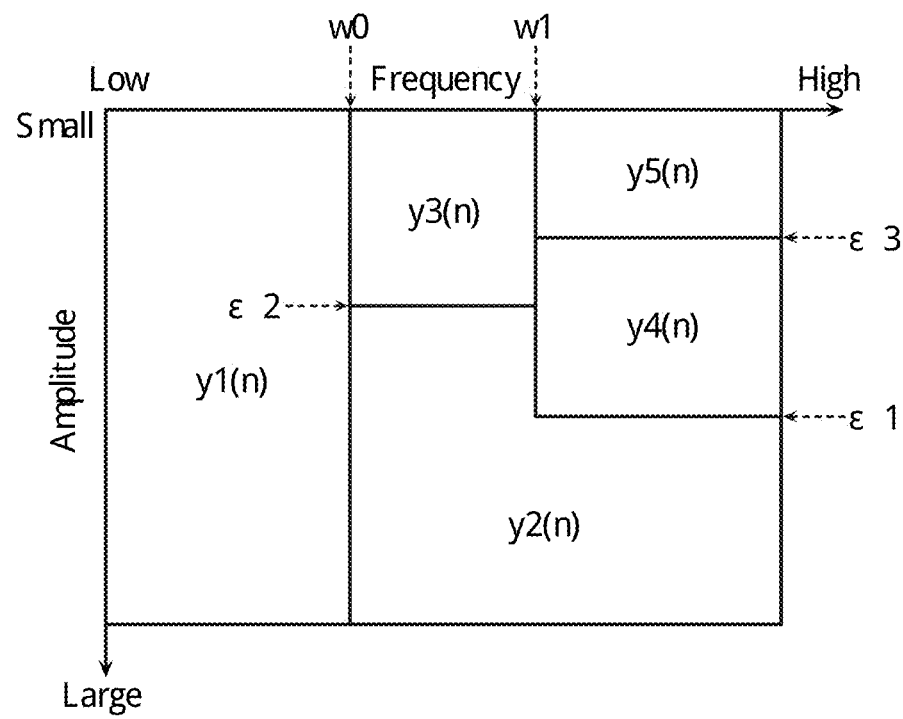
FIG. 7 is a view illustrating a division example of each component of face image information in the amplitude-frequency space by the E-filter bank of the face image processing unit of the face image processing system.

FIG. 7 is a view illustrating a division example of each component of face image information in the amplitude-frequency space by the ε-filter bank of the face image processing unit of the face image processing system. Furthermore, FIG. 8 is a view illustrating an example of a face image prior to face image processing indicated by the face image information inputted to the face image processing unit of the face image processing system.

Figure 8:
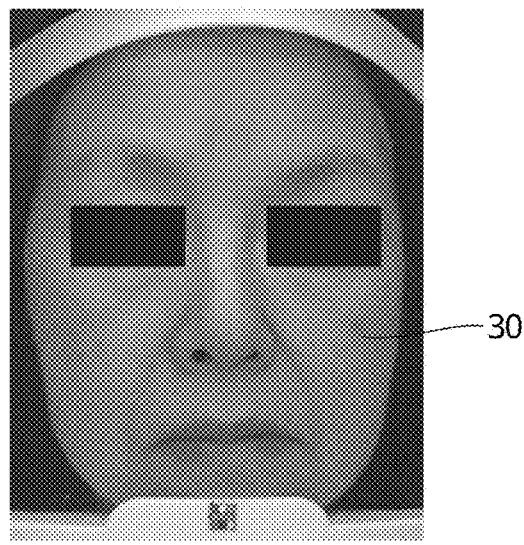
FIG. 8 is a view illustrating an example of a face image prior to face image processing indicated by the face image information inputted to the face image processing unit of the face image processing system.

In addition, covered both eye portions in images are displayed in face images subsequent to FIG. 8. However, the both eye portions may be actually displayed, and a state including all portions of the above exclusion region are displayed in illustrated examples. The ε-filter bank 11 configured as described above divides the amplitude-frequency space of the input signal x(n) into each region illustrated in FIG. 7, for example.

Furthermore, main portions such as the eyes, the nose, the mouth and the eyebrows (i.e., the eye region, the nose region and the mouth region) in face image information indicating an input face image 30 as illustrated in FIG. 8 are known to be generally indicated as large amplitude signals. Furthermore, a face base (structure) portion (e.g., cheeks) is expressed as a low frequency signal.

Furthermore, portions such as a wrinkle (a fine wrinkle in particular) portion and a fleck portion of the face skin which become a factor for undermining a beautiful outlook of skin are expressed as a signal of a relatively small amplitude and a high frequency. Furthermore, a pore component which is natural recesses and protrusions of the face skin is expressed as a high frequency signal of a small amplitude. Hence, the ε-filter bank 11 of the face image processing unit 10 of the face image processing system according to the present embodiment divides the input signal x(n) in the amplitude-frequency space illustrated in FIG. 7, for example.

That is, the ε-filter bank 11 divides the input signal x(n) into the first component y1(n) and the second component y2(n) indicating the structural components of the face image, and the third component y3(n), the fourth component y4(n) and the fifth component y5(n) indicating the predetermined components of the skin of the face image.

Then, the fourth component y4(n) indicating the predetermined component of the skin of the face image is extracted. In addition, it is possible to construct (generate) a wrinkle component extracted display face image which can be displayed by extracting a wrinkle component of the skin from the original input face image 30 at, for example, a stage after the ε-filter bank A11a, for example, based on the extracted fourth component y4(n). Furthermore, it is possible to construct (generate) face image information indicating a fleck component extracted display face image and a pore component extracted display face image which can be displayed by extracting a fleck component and a pore component of the skin respectively from the original input face image 30 at a stage after the ε-filter bank B11b.

More specifically, the ε-filter bank 11 illustrated in FIG. 6 sets the window sizes w0 and w1 of the linear low bandpass filter L and the ε-filters E1, E2 and E3, and the values ε1, ε2 and ε3 of the ε-filters E1, E2 and E3 to appropriate values. Then, as illustrated in FIG. 7, the first and second components y1(n) and y2(n) can be set to the face main portions and base (structure) portion, and the third component y3(n), the fourth component y4(n) and the fifth component y5(n) can be set to the predetermined components of the skin.

In this regard, the window size w0 divides frequency bands of the third component y3(n) and the first component y1(n), the window size w1 divides frequency bands of the third component y3(n) and the fifth component y5(n). Furthermore, a value ε1 of ε of the ε-filter E1 is approximately a maximum value of the amplitude (peak-peak) of the fourth component y4(n), a value ε2 of ε of the ε-filter E2 is approximately a maximum value of the amplitude (peak-peak) of the third component y3(n), and a value ε3 of ε of the ε-filter E3 is approximately a maximum value of the amplitude (peak-peak) of the fifth component y5(n).

The ε-filter bank A11a configured as described above divides the first and second components y1(n) and y2(n) indicating the main portions and base (structure) portion of the face image from the input signal x(n) as described above to input to the synthesizing unit 14. Furthermore, the ε-filter bank A11a divides the third, fourth and fifth components y3(n), y4 (n) and y5 (n) indicating the predetermined components of the skin of the face image from the input signal x(n) to extract the fourth component y4(n) and input the fourth component y4(n) to the component recognizing unit A12a of the component extracting unit 16, and input the third and fifth components y3(n) and y5(n) to the synthesizing unit 14.

Furthermore, the ε-filter bank B11b divides the first to fifth components y1(n) to y5(n) of the face image from the input signal x(n) obtained by subtracting the wrinkle component from the input face image by the adder/subtractor 6 as described above to input the first, second, third and fifth components y1(n), y2(n), y3(n) and y5(n) to the synthesizing unit 14, and extract the fourth component y4(n) and input the fourth component y4(n) to the component recognizing unit B12b of the component extracting unit 16.

The component recognizing unit A12a first recognizes the wrinkle component in the face image based on the inputted fourth component y4(n). Next, the component recognizing unit B12b recognizes the fleck component and the pore component in the face image based on the inputted fourth component y4(n).

That is, the component recognizing unit 12 scans all pixels of the face image constituted by, for example, the fourth component y4(n) and the face region image, and recognizes each of these components as a black portion of which luminance value is minus. Furthermore, the portion recognized as each component is classified into the pore component, the fleck component and the wrinkle component by an area of a pixel mass (pixel group) which is a mass of a number of pixels of each portion, and a dispersion distribution of pixels, and an appearance position and a shape of each of these components in the face image are distinguished.

Figure 9:
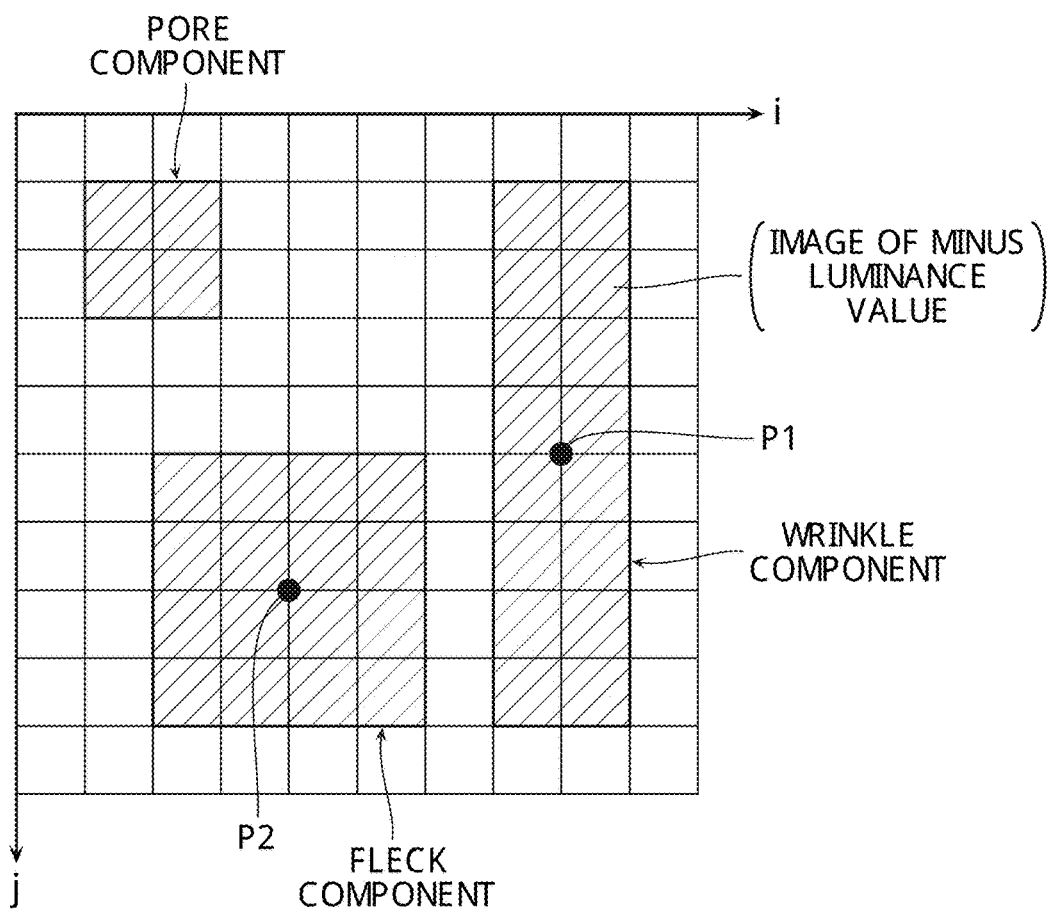
FIG. 9 is a view for explaining a method for recognizing and distinguishing a wrinkle component, a fleck component and a pore component by a component recognizing unit of the face image processing unit of the face image processing system.

FIG. 9 is a view for explaining a method for recognizing and distinguishing a wrinkle component, a fleck component and a pore component by the component recognizing unit of the face image processing unit of the face image processing system. As illustrated in FIG. 9, for example, the pore component and the fleck component are distinguished based on the area of the pixel group. That is, when the pore component and the wrinkle component among each component recognized as the black portion are compared, a relatively small area of the pixel group as illustrated in FIG. 9 is distinguished as the pore component, and a relatively large area of the pixel group as illustrated in FIG. 9 is distinguished as a fleck component.

On the other hand, for example, the fleck component and the wrinkle component are distinguished based on a magnitude of the dispersion distribution from a center point of the pixel group. That is, when the fleck component and the wrinkle component among each component recognized as the black portion are compared, the small dispersion distribution from a center point P2 of the pixel group is distinguished as the fleck component, and the large dispersion distribution from a center point P1 of the pixel group is distinguished as the wrinkle component.

In addition, the portion distinguished as the fleck component may be further compared with a predetermined threshold or the like, and then may be divided into, for example, a large fleck component and a small fleck component. The appearance position and the shape of each component in the face image are automatically recognized during distinction. The extracted display face image displayed by extracting each component recognized and distinguished in this way is as follows.

Figure 10:
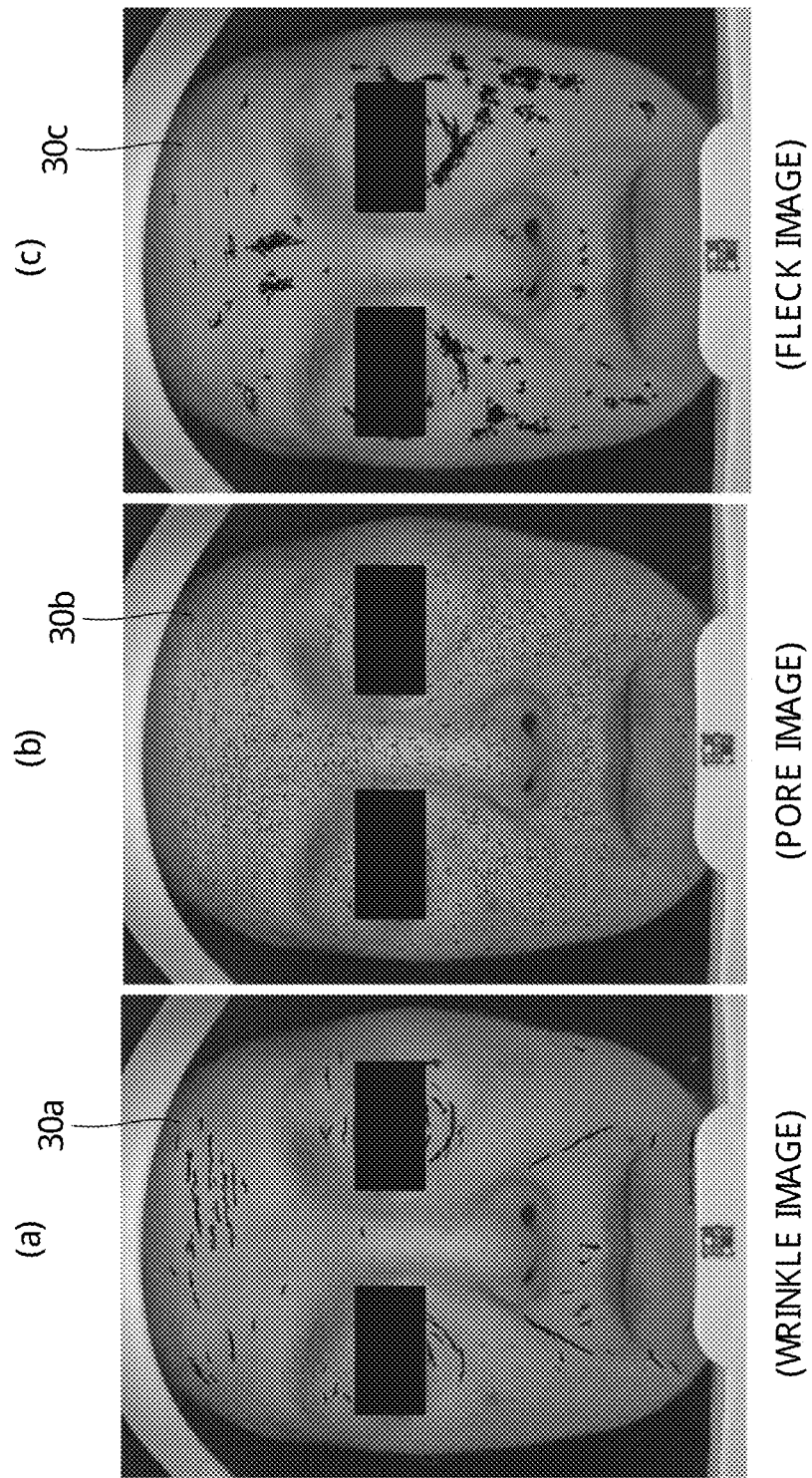
FIG. 10 is a view illustrating a face image displayed by extracting each component distinguished by the component recognizing unit of the face image processing unit of the face image processing system.

FIG. 10 is a view illustrating a face image displayed by extracting each component distinguished by the component recognizing unit of the face image processing unit of the face image processing system. When the face image displayed by extracting each component by the component recognizing unit 12 is displayed on a display screen of a display which is, for example, one component of the output means 3, each face image is displayed as follows.

That is, a wrinkle component extracted display face image 30a which is a "wrinkle image" displayed by extracting the wrinkle component is as illustrated in FIG. 10(a). Furthermore, a pore component extracted display face image 30b which is a "pore image" displayed by extracting the pore component is as illustrated in FIG. 10(b). Furthermore, a fleck component extracted display face image 30c which is a "fleck image" displayed by extracting the fleck component is as illustrated in FIG. 10(c).

In addition, although not illustrated, as a method for improving precision of recognition and distinction of each of the above components, the face image processing system according to the present embodiment can adopt a following method. First, parameters of the ε-filter bank A11a and the ε-filter bank B11b are differed, and the fourth component y4(n) extracted by the ε-filter bank B11b includes a lower frequency. Furthermore, the component recognizing unit A12a and the component recognizing unit B12b perform following processing.

That is, the component recognizing unit A12a first (1) sets pixels of which fourth component y4(n) is a predetermined threshold $TH_1$ or less to black, and sets other pixels to white in a processing target region of the face region image. Next, (2) the mass of the black pixels are labeled. Furthermore, (3) the number of pixels which is the mass of a label L is $n_L$, and a spatial dispersion is $v_L$. Lastly, when $v_L/n_L$ is larger than a predetermined threshold $TH_2$, a signal of the fourth component y4(n) corresponding to the label L is recognized as the wrinkle component, and the appearance position and the shape are distinguished to extract the wrinkle component. Consequently, it is possible to generate the wrinkle component extracted display face image obtained by completely extracting the wrinkle component from the input face image.

Furthermore, it is possible to generate the wrinkle component removed display face image by subtracting from the input face image information x(n) the face image from which the wrinkle component has been extracted, and then the wrinkle component removed display face image is inputted to the ε-filter bank B11b, and analyzed again. Subsequently, the component recognizing unit B12b (1) sets pixels of which fourth component y4(n) is a predetermined threshold $TH_3$ or less to black, and other pixels to white in the processing target region of the face region image. Next, (2) the mass of the black pixels are labeled. Furthermore, (3) the number of pixels which is the mass of the label L is $n_L$, and a spatial dispersion is $v_L$.

Furthermore, (4-1) when $n_L$ is larger than a predetermined threshold $TH_4$ and $v_L/n_L$ is smaller than a predetermined threshold $TH_5$, a signal of the fourth component y4(n) corresponding to the label L is recognized as the fleck component, and the appearance position and the shape are distinguished to extract the fleck component. Consequently, it is possible to generate the fleck component extracted display face image obtained by completely extracting the fleck component from the input face image. Furthermore, it is possible to generate the fleck component removed display face image by subtracting from the input face image information x(n) the face image from which the fleck component has been extracted.

On the other hand, (4-2) when $n_L$ is equal to or more than 1 and smaller than a predetermined threshold $TH_6$ and $v_L/n_L$ is smaller than a predetermined threshold $TH_7$, a signal of the fourth component y4(n) corresponding to the label L is recognized as the pore component, and the appearance position and the shape are distinguished to extract the pore component. Consequently, it is possible to generate the pore component extracted display face image obtained by completely extracting the pore component from the input face image. Furthermore, it is possible to generate the pore component removed display face image by subtracting from the input face image information x(n) the face image from which the pore component has been extracted.

Thus, by performing processing of extracting the wrinkle component first and then extracting the fleck component and the pore component, it is possible to further improve recognition and distinction precision of each component, and generate each of the extracted display face images 30a to 30c displayed by more precisely extracting component. In this regard, the above recognition/extraction order of the wrinkle component, the fleck component and the pore component is exemplary, and therefore the recognition/extraction order of each component can be optionally changed.

Thus, the wrinkle component, the fleck component and the pore component recognized and distinguished as the components in the face image by the component recognizing unit 12 are outputted to the component adjusting unit 13, and are weighted by each of the removal rate adjusting units 13a to 13c, so that the removal rates in the face image are respectively adjusted. The component adjusting unit 13 adjusts the removal rate of each component optionally or at random, for example, and stores this removal rate in the storage means 4.

Furthermore, the wrinkle component, the fleck component and the pore component of which removal rates have been adjusted are inputted to the synthesizing unit 14, and this synthesizing unit 14 synthesizes the wrinkle component, the fleck component and the pore component which are amplified or attenuated at the removal rate of each component, with the input face image information x(n) or the first, second, third and fifth components. Thus, a plurality of candidate face images which expresses (removes or adds) each component of the wrinkle component, the fleck component and the pore component at the removal rate optionally or at random is finally generated. In addition, a plurality of candidate face images generated first after face image processing starts can be displayed as, for example, first generation candidate face images on the display screen of the display.

Figure 11:
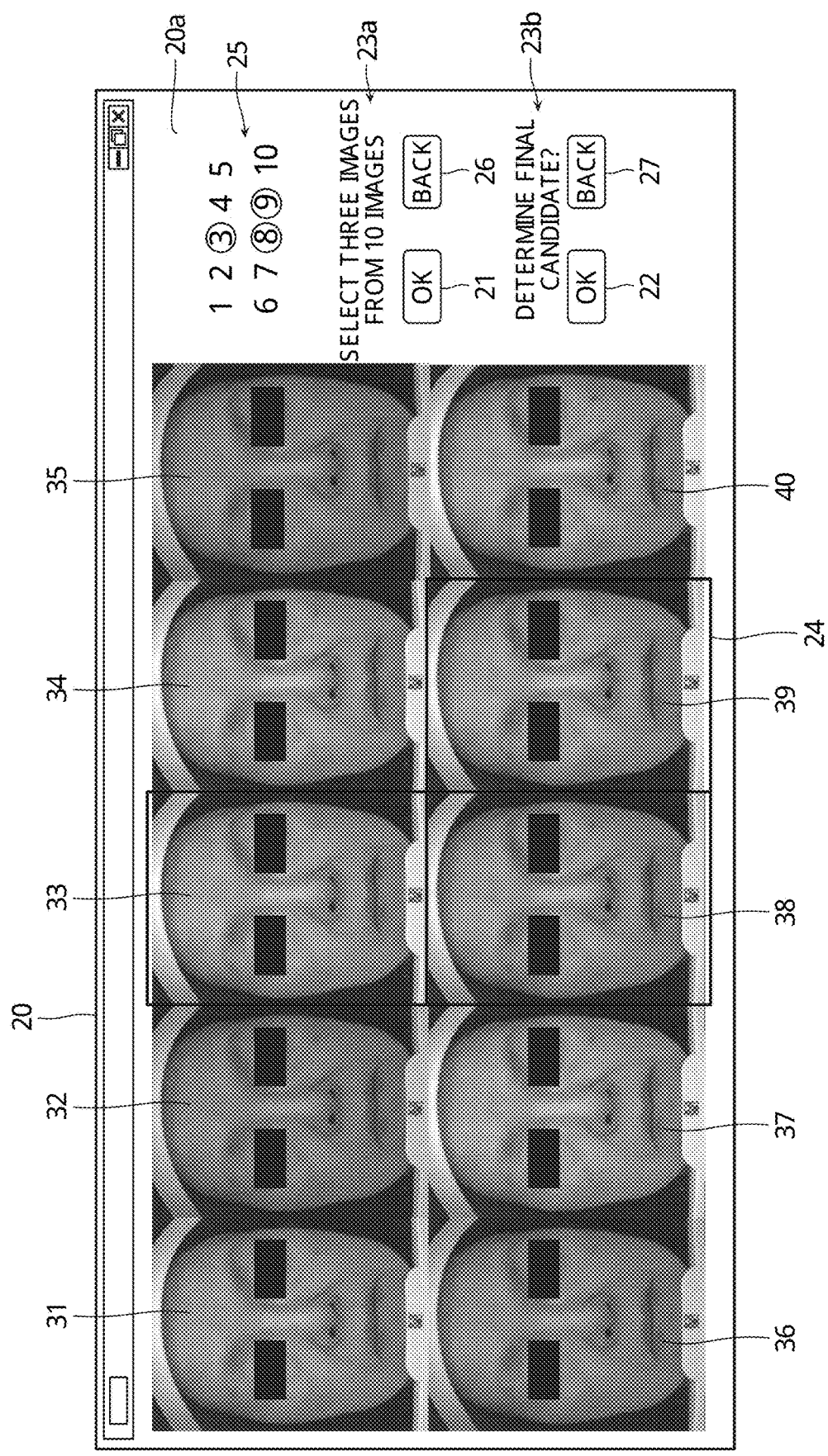
FIG. 11 is a view illustrating a display state of a candidate face image displayed on a display screen of the face image processing system.

FIG. 11 is a view illustrating a display state of a candidate face image displayed on a display screen of the face image processing system. As illustrated in FIG. 11, a plurality of (10 in this case) first generation candidate face images 31, 32, 33, 34, 35, 36, 37, 38, 39 and 40 which expresses each of wrinkle, fleck and pore components at random is displayed in a window frame 20 on the display screen. Furthermore, a panel display unit 20*a* is displayed at a right end portion of the window frame 20. This panel display unit 20*a* includes, for example, OK buttons 21 and 22, selection message display fields 23*a* and 23*b*, a candidate face image number display field 25 and back buttons 26 and 27. Numbers 1 to 10 associated with the candidate face images 31 to 40 are displayed in the candidate face image number display field 25. Furthermore, a text message "Select 3 images from 10 images" is displayed in the selection message display field 23*a*. Furthermore, a text message "Determine final candidate?" is displayed in the selection message display field 23*b*.

In addition, the candidate face image selected by a selection frame 24 or the candidate face image number display field 25 by a user by using one component of the input means 1 such as the keyboard or the mouse and so on is displayed while being surrounded by the selection frame 24, for example, and a corresponding candidate face image number is encircled and displayed in the candidate face image number display field 25. That is, the user selects the candidate image by moving and selecting the selection frame 24 using the mouse etc. or by selecting the candidate face image number in the candidate face image number display field 25. FIG. 11 illustrates an example of a state where the user selects three of the candidate face images 33, 38 and 39 by the selection frame 24 and the candidate face image number display field 25. When the OK button 21 is selected and pushed in this state, the three candidate face images are selected. On the other hand, when the OK button 22 is selected and pushed in a state where the one final selection face image is selected by the selection frame 24 or the like, the final candidate face image is selected and determined. In addition, the back buttons 26 and 27 are selected and pushed to return to a previous screen or previous processing.

Furthermore, when the OK button 21 is selected and pushed to select the candidate face image, the next generation candidate face image is generated based on the candidate face images 33, 38 and 39 selected by the user. In addition, in this case, parameters of the above removal rates used for each processing such as component extraction processing of the component extracting unit 16 and removal rate adjustment processing of the component adjusting unit 13, and various parameters such as the window sizes w0 and w1 and the values ε1, ε2 and ε3 of E can be set to optimal values by, for example, interactive evolutionary computation (IEC) which uses a known genetic algorithm (GA).

In this regard, the setting of the optimal values is not limited to interactive evolutionary computation which uses the genetic algorithm, and may be set by other various computation methods. In this regard, crossover processing and mutation processing based on the interactive evolutionary computation which uses the known genetic algorithm will be briefly described.

IEC which uses the GA in the face image processing system according to the present embodiment first assumes that, for example, the parameters of the above removal rates, the window sizes w0 and w1, the values ε1, ε2 and ε3 of ε and the other various parameters are joined and expressed as binary digits. Furthermore, the joined digits are one chromosome, and this chromosome represents one individual.

Next, the GA is applied to the individual expressed in this way. First, according to the crossover processing, for example, two images of the three selected candidate face images 33, 38 and 39 are crossed over at random a plurality of times (twice in this case) to eventually generate a plurality of (four in this case) crossed-over candidate face images. Thus, the crossed-over candidate face images obtained by crossing tastes (preferences) of the respective images are generated. In addition, the crossed-over candidate face images are the second generation (next generation) in the present embodiment.

Next, according to the mutation processing, to prepare 10 candidate face images displayed in the window frame 20 from the three candidate face images 33, 38 and 39 selected as described above and the four candidate face images generated by the crossover processing, one point in a gene sequence of each of the three candidate face images selected at random is changed to generate three mutated candidate face images.

In addition, the mutation processing is necessary to meet a following request, too. That is, when only the crossover processing is performed without the mutation processing, and only resulting candidate face images are displayed in the window frame 20, if there is no face image matching the user's taste (preference) among the first generation candidate face images 31 to 40, genetic crossover occurs with a combination of face images which are not user's preference in the second generation. In this case, there is a failure that face images close to the user's taste cannot be selected. Hence, to prevent this failure, the mutation processing also needs to be performed together with the crossover processing.

Furthermore, a plurality of candidate face images generated after the crossover processing and the mutation processing is displayed as the second generation (next generation) candidate face images together with the three candidate face images 33, 38 and 39 selected from the first generation (previous generation) in the window frame 20 on the display screen of the display which is one component of the output means 3.

Thus, by selecting the one candidate face image by, for example, the selection frame 24 and selecting and pushing the OK button 22 below the selection message display field 23*b* after the second generation candidate face images are displayed, the user can determine a final candidate. Furthermore, when the user selects the three candidate face images again from the second generation candidate face images as described above, and selects and pushes the OK button 21 below the selection message display field 23a, next generation candidate face images are further generated and displayed. Thus, when the user determines one candidate face image matching the user's taste among the candidate face images displayed in the window frame 20 on the display screen, this determined candidate face image is an output face image to be finally outputted.

In addition, in this case, the one candidate face image finally determined by the user may be displayed together with the removal rate of each of the wrinkle, fleck and pore components in another window frame on the display screen, for example. In this case, various parameters for generating face image information indicating the finally determined candidate face image are stored as user reference parameters together with the removal rate of each component in the storage means 4. On the other hand, when the user does not determine one candidate face image matching the user's taste, a plurality of candidate face images is repeatedly generated as third generation and fourth generation as described above until the candidate face image is finally determined.

Thus, the face image processing system according to the first embodiment can adjust the removal rates of the wrinkle component, the fleck component and the pore component included in a face image of the user by the face image processing, and generate the face image. Consequently, it is possible to freely generate a more natural face image which is ideal for the user.

In addition, a method for utilizing the face image processing system according to the present embodiment is, for example, as follows. That is, for example, the face image processing system is introduced to a cosmetics store. Furthermore, face image information indicating a non-makeup face image of a user visiting the cosmetics store is inputted to the face image processing system.

Subsequently, for example, (1) the face image processing unit 10 generates a face image to which a user's favorite foundation is applied, compares these face images and evaluates a concealer effect of the foundation of each component of a wrinkle component, a fleck component and a pore component. Alternatively, (2) the face image processing unit 10 generates face images to which different foundations have been applied, and evaluates a concealer effect or concealer performance of each component resulting from a difference in these foundations.

Furthermore, (3) a change in the concealer effect or the concealer performance of each component accompanied by a change over time in the face image to which the foundation has been applied is checked, and makeup durability over time is evaluated. Furthermore, (4) new makeup products (makeup products such as foundations, BB (Blemish Balm) and concealers etc.) are developed based on these evaluation results, and face image information and the reference parameter accompanied by the evaluation results and so on.

Furthermore, in addition to the foundations and the like, (5) wrinkle, fleck and pore and so forth amelioration effects etc. of various skincare products are evaluated. Thus, the face image processing system can be effectively utilized for (1) to (5), for example. Next, an image processing procedure of the face image processing method carried out by the face image processing system will be described.

Figure 12:
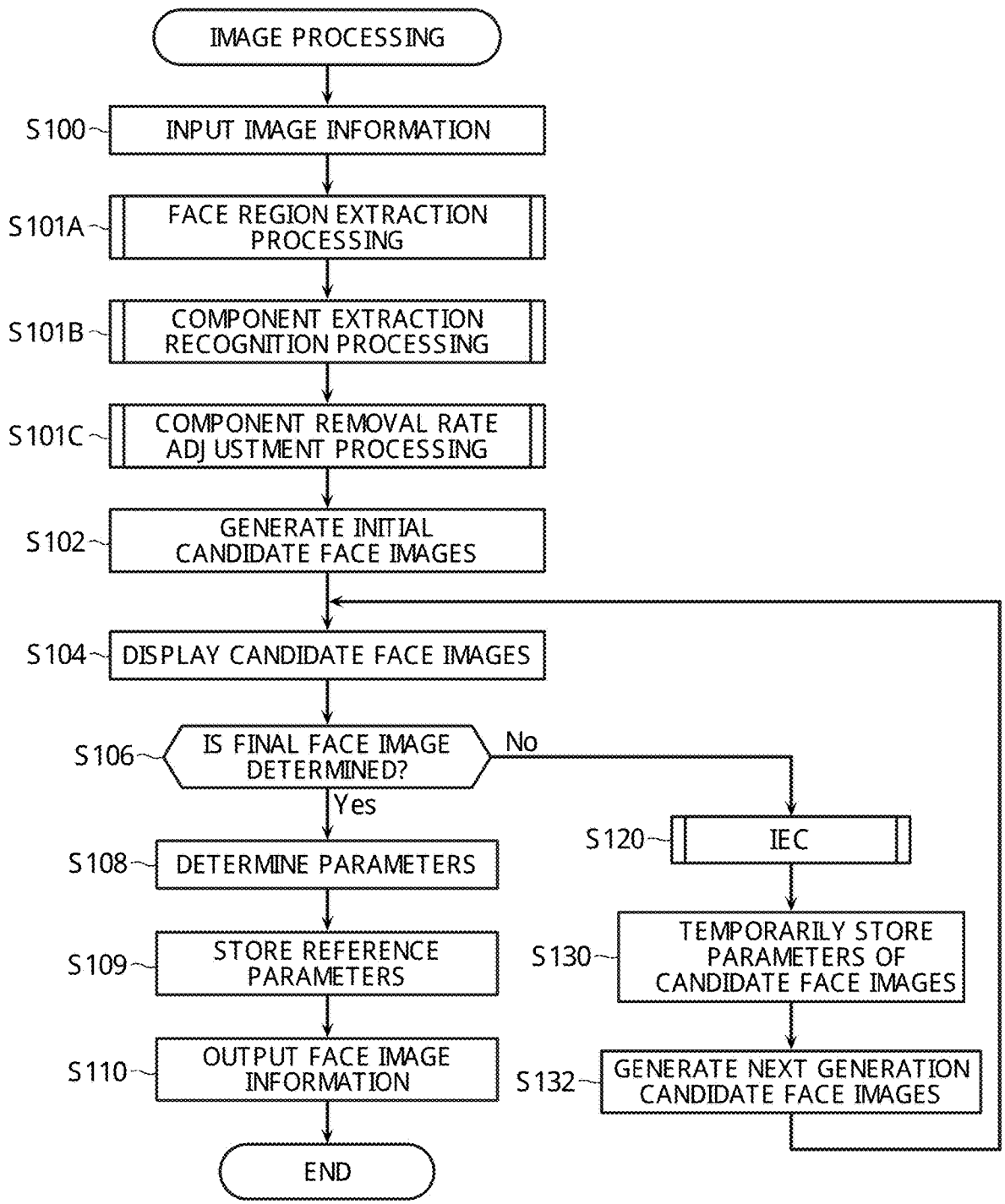
FIG. 12 is a flowchart illustrating an image processing procedure of a face image processing method according to a second embodiment of the present invention.
Figure 13:
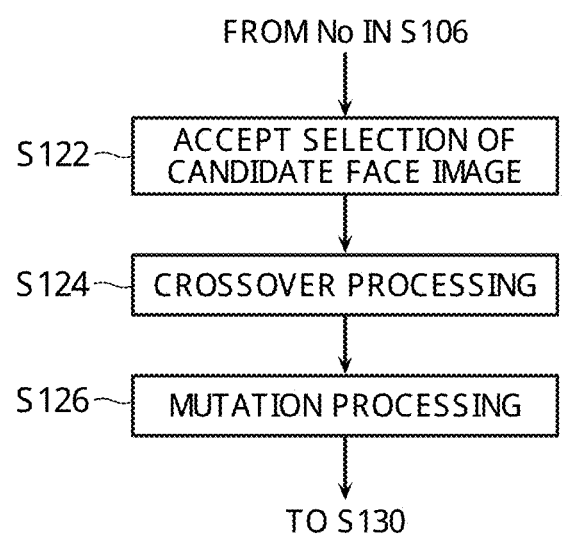
FIG. 13 is a flowchart illustrating part of processing contents of the image processing procedure of the face image processing method.

FIG. 12 is a flowchart illustrating the image processing procedure of the face image processing method according to a second embodiment of the present invention. Furthermore, FIG. 13 is a flowchart illustrating part of processing contents of the image processing procedure of this face image processing method. In addition, portions and components which are the same as or correspond to the above-described portions and components will be assigned the same reference numerals and will not be described below.

The face image processing method according to the present embodiment is realized by installing a face image processing program prepared in advance in a computer (computing means 2) of a face image processing system and causing the computer to execute the face image processing program. In addition, this computer is realized by a general configuration including a main body which includes various computing devices and storage devices (storage means 4) such as a CPU, a RAM, a ROM, an HDD and an SSD, a display (output means 3) which displays various information on a display screen, and an input device (input means 1) such as an input interface (input I/F) which inputs accepted information to the CPU, a keyboard and a mouse and so on. Hereinafter, a processing subject is a computer unless otherwise stated.

As illustrated in FIG. 12, image information (image data) of an input face image including a subject face image of a user illustrated in FIG. 8 is first inputted via an input I/F (step S100). Furthermore, a computer performs above face region extraction processing based on the inputted image information (step S101A). Thus, the face image information indicating the face region image from which an exclusion region has been excluded is generated. In addition, when a face region is not extracted, the face region extraction processing in this step S101A is omitted.

Next, the computer performs above component extraction recognition processing (step S101B) and component removal rate adjustment processing (step S101C), generates a plurality of initial (first generation) candidate face images (step S102), and displays these candidate face images on a display (step S104).

In this regard, M sets of a removal rate of each of the above components, various parameter values such as parameters of w0, w1, ε1, ε2 and ε3 and numerical values are created at random for the initial candidate face images, and one processing image is obtained per set of the various parameters and the numerical values, so that M output images (candidate face images) can be eventually generated and obtained. By displaying the output images on the display, the user can visually check M candidate face images of different removal rates of a wrinkle component, a fleck component and a pore component.

When, for example, a final face image of the most subjectively desirable wrinkle, fleck and pore display states for the user is not found among a plurality of candidate face images displayed in this way, the user uses an input device such as a mouse to select a candidate face image displayed by a selection frame 24 or the like in a window frame 20 and make a selection instruction of S desired candidate face images.

Hence, the computer decides whether or not the final face image is determined based on information from the input device (step S106). When accepting the determination instruction of the final face image and determining the face image to output (Yes in step S106), the computer determines various parameters including the removal rates and data parameters for generating face image information indicating this face image in the computer (step S108), and stores these determined parameters as reference parameters in a storage device (step S109). Furthermore, the computer outputs the face image information indicating the final face image (step S110), and finishes a series of face image processing of this flowchart.

In addition, an output of the face image information in above step S110 includes various output modes for outputting image data to another computer, outputting image data to display on the display and outputting image data to print onto sheets of paper. Furthermore, by storing the above various parameters and reference parameters in the storage device in association with the face image information indicating the final face image, it is possible to output these parameters, too, together with the face image information indicating the final face image.

On the other hand, when the final face image is not determined in above step S106 (No in step S106), IEC which uses a GA is performed (step S120) to generate a plurality of next generation candidate face images. Subsequently, various parameters of a plurality of generated candidate face images are temporarily stored in the storage device (step S130), the next generation candidate face images are generated (step S132), and the flow moves to above step S104 to display the next generation candidate face images and repeat subsequent processing.

In this regard, the IEC in above step S120 is performed as illustrated in FIG. 13, for example. That is, in a case where the final face image is not determined in above step S106, the user has already made a selection instruction of a desired candidate face image, and therefore the computer accepts selection of the candidate face image designated by the user (step S122). Furthermore, crossover processing (step S124) and mutation processing (step S126) are performed based on various parameter values and numerical values applied to the accepted candidate face image.

That is, according to the IEC which uses the GA, the computer joins again the various parameter values, i.e., the removal rate of each component, the window sizes w0 and w1 and the values of ε1, ε2 and ε3 of ε applied to the face image information indicating S candidate face images (e.g., No in step S106 and S122) selected by the user from, for example, M initial (previous generation) candidate face images (step S104) displayed on the display as described above to regard as a chromosome of a binary digit notation.

Thus, the above crossover processing (step S124) is performed on the S selected individuals to generate new T1 individuals. Furthermore, when the mutation processing (step S126) is performed on the S selected individuals and the T1 generated individuals to generate new T2 individuals. These T1 and T2 individuals are next (next generation) candidate face images. In addition, S+T1+T2 is a value equal to, for example, M.

The various parameter values, the window sizes w0 and w1 and the values ε1, ε2 and ε3 of ε indicated by the S+T1+T2 individuals obtained by these crossover processing and mutation processing are used to generate face image information indicating candidate face images. That is, the S+T1+T2 face images (candidate face images) can be outputted in this way.

The S+T1+T2 candidate face images obtained in this way are displayed on the display again (step S104 after steps S130 and S132), the most subjectively desirable face image for the user is determined as a final face image if there is this face image, and the user is caused to select the S desired face images again if there is not this face image.

Subsequently, the computer performs the crossover processing and the mutation processing again based on the S individuals. This processing is repeated until the final face image which satisfies the user is determined (Yes in step S106). By performing the face image processing in this way, it is possible to generate a more natural face image of which display state of the wrinkle component, the fleck component and the pore component is close to a user's preference, i.e., which is ideal for the user. Furthermore, it is possible to effectively use face image information indicating the generated face image together with various parameter values, numerical values and reference parameters for various fields.

Figure 14:
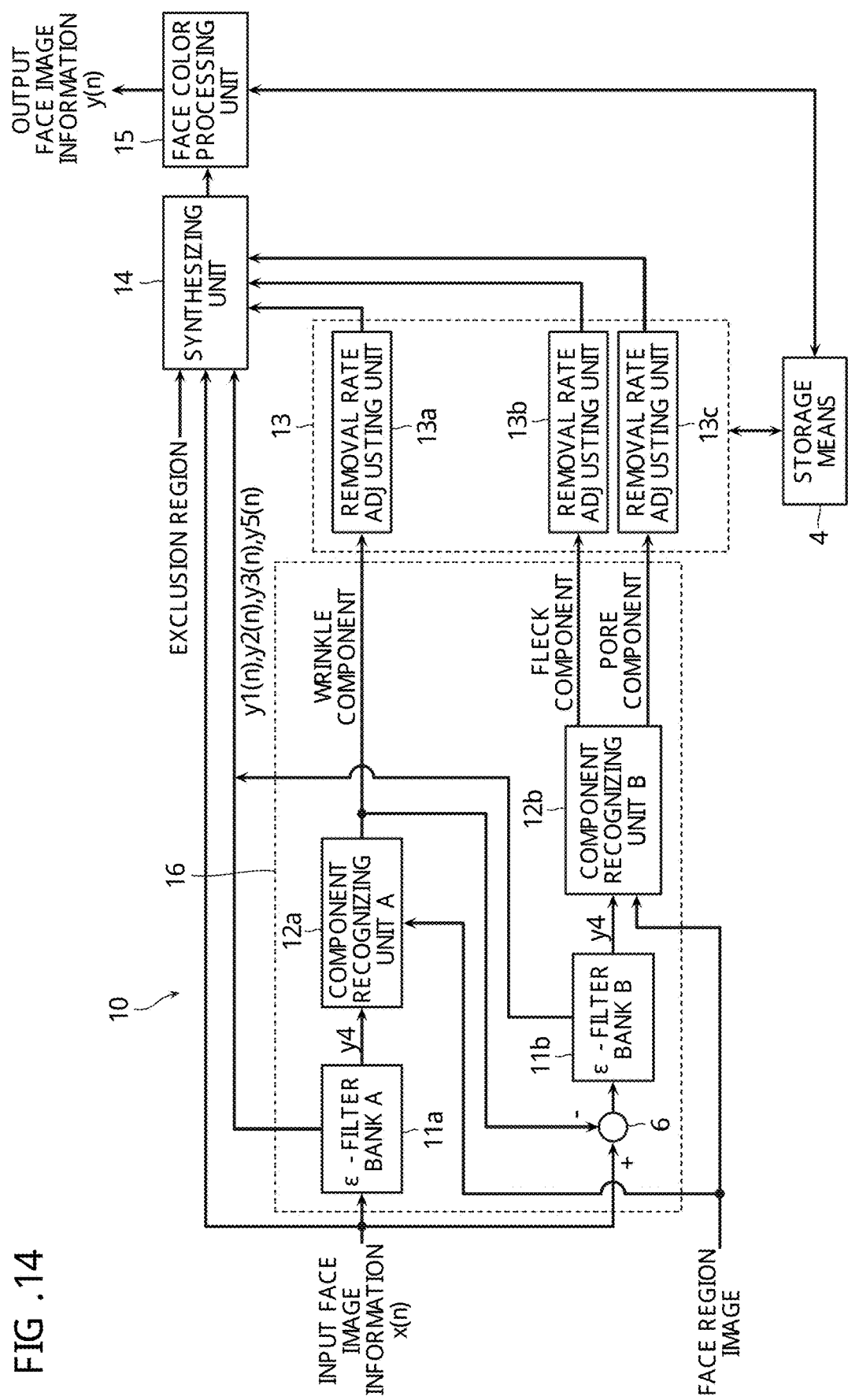
FIG. 14 is a block diagram illustrating an entire configuration of a face image processing system according to a third embodiment of the present invention.
Figure 15:
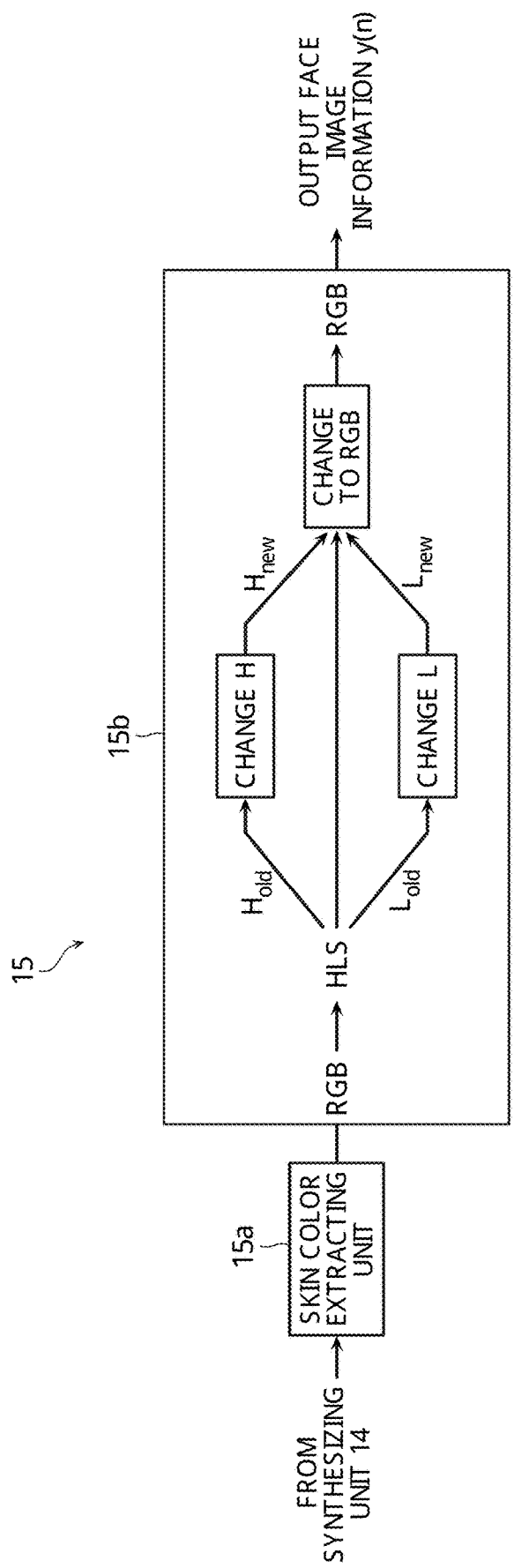
FIG. 15 is a block diagram illustrating an internal configuration of a face color processing unit of the face image processing system.
Figure 16:
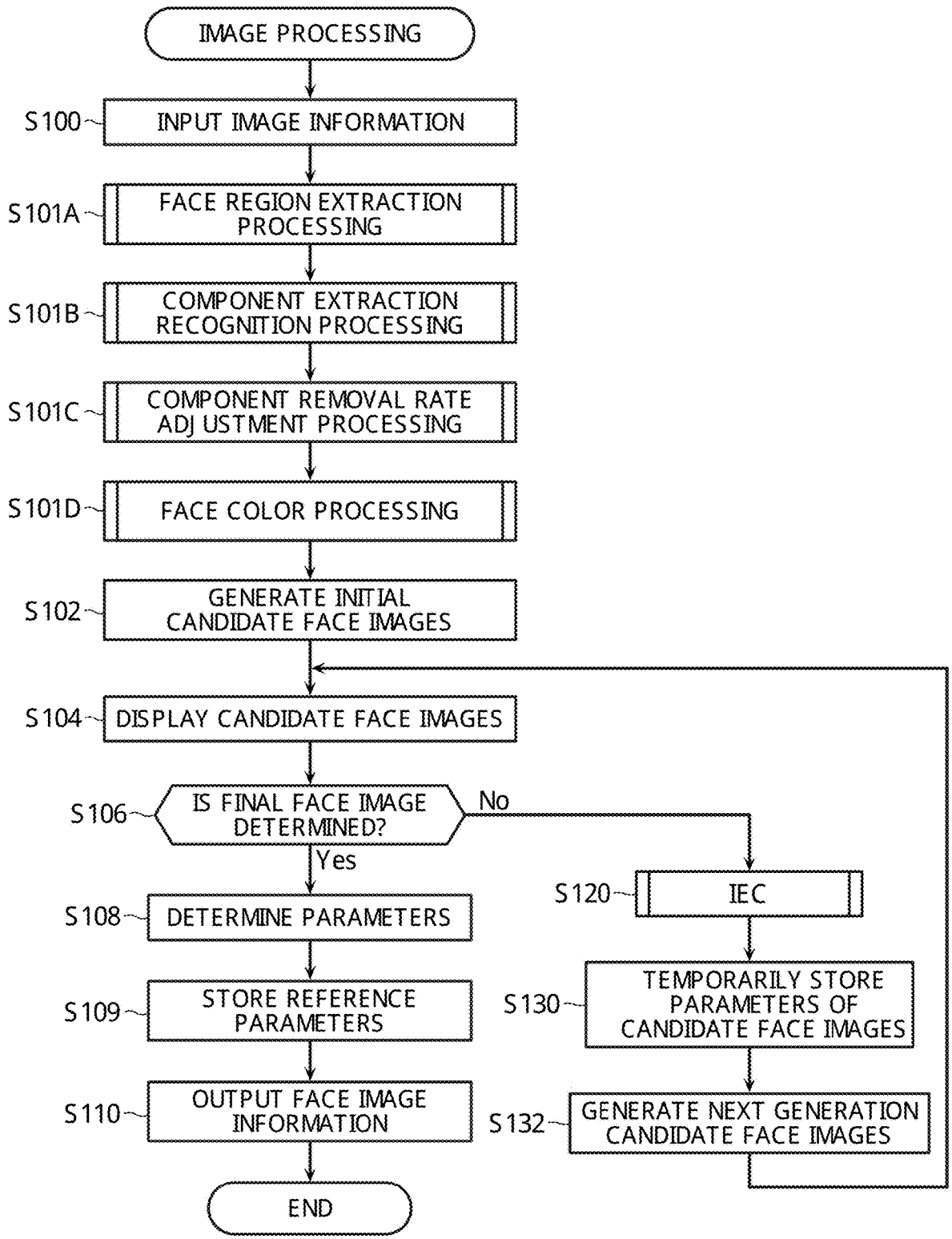
FIG. 16 is a flowchart illustrating the image processing procedure of the face image processing system.

FIG. 14 is a block diagram illustrating an entire configuration of a face image processing system according to a third embodiment of the present invention, and FIG. 15 is a block diagram illustrating an internal configuration of a face color processing unit of this face image processing system. Furthermore, FIG. 16 is a flowchart illustrating an image processing procedure of the face image processing system. The face image processing system according to the third embodiment includes the face color processing unit 15 in part of the above configuration of the face image processing unit 10, which is different from the face image processing system according to the first embodiment employing a configuration where a face image processing unit 10 does not include a face color processing unit 15.

As illustrated in FIG. 14, the face color processing unit 15 is provided at a stage subsequent to a synthesizing unit 14. As illustrated in FIG. 15, this face color processing unit 15 employs a configuration including, for example, a skin color extracting unit 15a which extracts from an output face image a skin color region of which at least one of a luminance and color information of face image information indicating the output face image from the synthesizing unit 14 is in a predetermined range, and a shade adjusting unit 15b which changes a shade of the skin color in the extracted skin color region.

In this regard, color information includes, for example, RGB value, CMYK value, CIELAB (L*a*b*) values, a Munsell display value, CIEXYZ values, a density value obtained by a filter, a spectral image, a spectral reflection waveform, a reflection transmittance, an infrared wavelength, an ultraviolet wavelength or an x-ray wavelength and so on. For example, in an L*a*b* color system, L* represents a luminosity, and a*b* can be also used for a hue and a saturation to represent a color tone.

In addition, the face color processing unit 15 uses a plurality of preset patterns of which at least one of a luminance and color information stored in advance in a storage means 4 is in a predetermined range, and various parameter values. Each of these present patterns and various parameter values may be stored in the face color processing unit 15.

Each preset pattern may be classified per race, gender, living environment (a latitude, an altitude and an area), season or time and so on and set in advance. Furthermore, the skin color extracting unit 15a extracts a skin color region of which at least one parameter value of the luminance and the color information is in the predetermined range designated by a preset pattern, based on, for example, the preset pattern designated by the user. In addition, the skin color extracting unit 15a extracts, for example, the skin color region of an entire face region of an inputted output face image.

Furthermore, the shade adjusting unit 15b changes the color information in the skin color region such as the hue and the luminance of each pixel extracted by the skin color extracting unit 15a by using following equations (4) and (5). In addition, variables X and Y in the equations can take values of $0 \leq X < 16$ and $0 \leq Y < 16$, respectively.

[Mathematical 4]

$$\text{Hue}: H_{new}[i][j] = H_{old}[i][j] + X - 5 \quad (4)$$

(H[i][j] represents hue value of pixel position [i][j])

[Mathematical 5]

$$\text{Luminance:} L_{new}[i][j] = L_{old}[i][j] * ((Y-7)*0.02+1) \qquad (5)$$

(L[i][j] represents luminance value of pixel position [i][j])

That is, as illustrated in FIG. 15, the shade adjusting unit 15*b* expands, for example, the color information of RGB of the skin color region from the skin color extracting unit 15*a* to an HLS (HSL) color space, and changes the hue (H) by above equation (4) from $h_{old}$ to $h_{new}$. Furthermore, the luminance (L) is changed by above equation (5) from $L_{old}$ to $L_{new}$. Furthermore, these changed hue (H) and luminance (L) are synthesized with an unchanged saturation (S) to convert into the color information of RGB of the skin color region, generate an output face image including the color information of RGB of the skin color region of the adjusted shade, and output face image information y(n).

In addition, although the shade adjusting unit 15*b* can adjust the shade without using above equations (4) and (5), the color changes at random in this case, and therefore a case where a skin color of a skin color region becomes an undesirable skin color is confirmed and therefore is not suitable. Data of the face color and parameter values of each processing in the face color processing unit 15 can be occasionally stored in the storage means 4 and used for face color processing.

The output face image information y(n) indicating the output face image in which the skin color has been changed in the skin color region in this way is outputted to an unillustrated output means 3 in a case illustrated in FIG. 14. In addition, for a change in the skin color generated and displayed as a candidate face image, a final candidate may be determined by IEC which uses the GA, for example. In this case, the skin color of the candidate face image finally determined by the user as an ideal face color is stored as face color data together with the various parameter values for determining the skin color in the storage means 4.

The image processing procedure of the face image processing system according to this third embodiment is as illustrated in FIG. 16, for example. That is, in the image processing procedure according to the above second embodiment, the above face color processing unit 15 performs face color processing (step S101D) at a stage subsequent to removal rate adjustment processing in step S101C. Thus, it is possible to generate candidate face images obtained by changing a face color (the skin color in the skin color region) at a time of generation of initial candidate face images (step S102), and display the candidate face images in next step S104.

Thus, the face image processing system according to third embodiment can not only adjust the removal rate of each component of wrinkle, fleck and pore components by face image processing, but also adjust a face color and generate a face image, so that it is possible to freely generate and output a more natural face image which is ideal for the user. In addition, the face image processing system according to the present embodiment may operate by using processing of the face color processing unit 15 as a mainstream. That is, the face image processing system may not perform processing related to the wrinkle component, the fleck component and the pore component according to the first embodiment, and generate candidate face images showing various changes in a skin color.

When specialized in face color processing, the face image processing system according to the present embodiment can be utilized to (1) obtain various parameter values and face color data from face image information indicating an output face image of a face color which is ideal of the user at, for example, a cosmetics store, and search and provide a foundation matching these parameter values and face color data. Furthermore, by using these various parameter values and face color data, the user can, for example, (2) directly search and purchase cosmetics matching a user's taste on the Internet without counseling and so forth with a staff at a cosmetics store.

Furthermore, the face image processing system according to the third embodiment is configured to utilize above (1) and (2) and be able to use all functions, for example, and, consequently, can function as a face beautifying system which can generate and output a face image obtained by idealizing each component of the wrinkle component, the fleck component and the pore component and a luminance and color information of the skin color of the user.

By, for example, making this face beautifying system mutually available on the Internet, it is possible to propose various cosmetics matching user's ideal face of adjusted face colors, wrinkles, flecks and pores to various users such as users living in regions in which the above counseling is not available, users of different languages, and users having difficulty in speaking.

Furthermore, by using various parameter values and data, a foundation which makes up an ideal user's face can be outputted by a 3D printer, and these items of data can be also used to make completely made-to-order cosmetics, and can be applied to a 3D makeup device which actually applies a makeup to a user's face based on a generated ideal face image.

In addition, the face image processing method described in the second embodiment can be realized not only when a computer executes the above face image processing program prepared in advance, and but also when the computer reads and executes the face image processing program recorded in a computer-readable recording medium such as an HD, a CD-ROM, a DVD or a memory card. The face image processing program may be a transmission medium which can be distributed via a network such as the Internet.

Although some embodiments of the present invention have been described above, these embodiments have been presented as exemplary embodiments, and do not intend to limit the scope of the invention. These new embodiments can be carried out as other various modes, and can be variously omitted, replaced or changed without departing from the gist of the invention. These embodiments and modifications of the embodiments are included in the scope and the gist of the invention, and are included in a range equivalent to the invention recited in the claims.

For example, the above embodiments employ the configurations where a wrinkle component, a fleck component and a pore component are recognized and distinguished based only on a fourth component y4(*n*) among third, fourth and fifth components y3(*n*), y4(*n*) and y5(*n*) indicating predetermined components of the skin extracted by an ε-filter bank 11 of the component extracting unit 16, yet is not limited to this.

That is, there may be employed a configuration where filter window sizes and filter values are adjusted, and all of the third to fifth components y3(*n*) to y5(*n*) indicating the predetermined components of the skin of the face image are used such that, for example, a fleck component of the skin is indicated by the third component y3(*n*), the wrinkle component of the skin is indicated by the fourth component y4(n), and the pore component which is natural recesses and projections of the skin is further indicated by the fifth component y5(n).

In this case, the ε-filter bank 11 divides input face image information x(n) into the first to fifth components y1(n) to y5(n), then outputs the first and second components y1(n) and y2(n) indicating structural components of a face image to the synthesizing unit 14, and outputs the third to fifth components y3(n) to y5(n) to a component recognizing unit 12.

Furthermore, the component recognizing unit 12 may recognize and distinguish the fleck component, the wrinkle component and the pore component based on the third to fifth components y3(n) to y5(n), and a component adjusting unit 13 may adjust the removal rate of each component. This configuration can also provide the same function and effect as those of the above embodiments, and freely generate more natural face images which are ideal for the user.

REFERENCE SIGNS LIST

1 INPUT MEANS
2 COMPUTING MEANS
3 OUTPUT MEANS
4 STORAGE MEANS
5 FACE REGION EXTRACTING UNIT
10 FACE IMAGE PROCESSING UNIT
11 ε-FILTER BANK
12 COMPONENT RECOGNIZING UNIT
13 COMPONENT ADJUSTING UNIT
13a to 13c REMOVAL RATE ADJUSTING UNIT
14 SYNTHESIZING UNIT
15 FACE COLOR PROCESSING UNIT
16 COMPONENT EXTRACTING UNIT
20 WINDOW FRAME

The invention claimed is:

1. A face image processing system comprising:
a component extracting means which receives an input of face image information indicating a face image, and extracts a wrinkle component, a fleck component and a pore component of the face image from the face image information;
a removal rate adjusting means which adjusts a removal rate of each of the wrinkle component, the fleck component and the pore component extracted by the component extracting means;
a storage means which stores the removal rate;
a synthesizing means which synthesizes the wrinkle component, the fleck component and the pore component which are amplified or attenuated at the removal rate adjusted by the removal rate adjusting means, and generates a face image; and
an output means which outputs the face image information synthesized by the synthesizing means.

2. The face image processing system according to claim 1, further comprising a face region extracting means which extracts the face image indicating a face region from which at least one of an eye region, a nose region and a mouth region of an input face image included in inputted image information has been removed.

3. The face image processing system according to claim 1, wherein the component extracting means includes
a filter means which divides the face image information indicating the inputted face image into a first component, a second component, a third component, a fourth component and a fifth component in an amplitude-frequency space, and extracts the fourth component, and
a component recognizing means which recognizes the wrinkle component, the fleck component and the pore component in the face image based on the fourth component extracted by the filter means, and distinguishes an appearance position and a shape of each component in the face image.

4. The face image processing system according to claim 2, wherein the component extracting means includes
a filter means which divides the face image information indicating the inputted face image into a first component, a second component, a third component, a fourth component and a fifth component in an amplitude-frequency space, and extracts the fourth component, and
a component recognizing means which recognizes the wrinkle component, the fleck component and the pore component in the face image based on the fourth component extracted by the filter means, and distinguishes an appearance position and a shape of each component in the face image.

5. The face image processing system according to claim 3, wherein the removal rate adjusting means adjusts the removal rate of each of the components in the face image by weighting the wrinkle component, the fleck component and the pore component.

6. The face image processing system according to claim 4, wherein the removal rate adjusting means adjusts the removal rate of each of the components in the face image by weighting the wrinkle component, the fleck component and the pore component.

7. The face image processing system according to claim 3, wherein the synthesizing means synthesizes the fourth component corresponding to the wrinkle component, the fleck component and the pore component based on the removal rate stored in the storage means, and the first component, the second component, the third component and the fifth component divided by the filter means or the inputted face image information.

8. The face image processing system according to claim 4, wherein the synthesizing means synthesizes the fourth component corresponding to the wrinkle component, the fleck component and the pore component based on the removal rate stored in the storage means, and the first component, the second component, the third component and the fifth component divided by the filter means or the inputted face image information.

9. The face image processing system according to claim 1, further comprising:
a face color processing means at a subsequent stage of the synthesizing means, the face color processing means including
a skin color extracting means which extracts a skin color region of which at least one of a luminance and color information of the face image information is in a predetermined range, and
a shade adjusting means which changes a shade of a skin color in the skin color region extracted by the skin color extracting means.

10. The face image processing system according to claim 2, further comprising:
a face color processing means at a subsequent stage of the synthesizing means, the face color processing means including a skin color extracting means which extracts a skin color region of which at least one of a luminance and color information of the face image information is in a predetermined range, and a shade adjusting means which changes a shade of a skin color in the skin color region extracted by the skin color extracting means.

11. The face image processing system according to claim 3, further comprising:

a face color processing means at a subsequent stage of the synthesizing means, the face color processing means including a skin color extracting means which extracts a skin color region of which at least one of a luminance and color information of the face image information is in a predetermined range, and a shade adjusting means which changes a shade of a skin color in the skin color region extracted by the skin color extracting means.

12. The face image processing system according to claim 4, further comprising:

a face color processing means at a subsequent stage of the synthesizing means, the face color processing means including a skin color extracting means which extracts a skin color region of which at least one of a luminance and color information of the face image information is in a predetermined range, and a shade adjusting means which changes a shade of a skin color in the skin color region extracted by the skin color extracting means.

13. The face image processing system according to claim 9, wherein a plurality of the face image information outputted from the output means is generated, the output means displays a plurality of candidate face images based on the plurality of generated face image information, on a display screen of a display means, the face image processing system further comprises an input means which accepts one of a selection instruction of a desired candidate face image designated by a user and a determination instruction of a final candidate face image from the plurality of displayed candidate face images, and a computing means which, when the input means accepts the selection instruction of the candidate face image, sets a parameter of each processing of the component extracting means, the removal rate adjusting means and the face color processing means based on the face image information indicating the selected candidate face image by interactive evolutionary computation by performing crossover processing and mutation processing based on a genetic algorithm, and the component extracting means, the removal rate adjusting means and the face color processing means repeatedly generate the face image information based on the parameter set by the computing means until the input means accepts the determination instruction of the candidate face image.

14. The face image processing system according to claim 10, wherein a plurality of the face image information outputted from the output means is generated, the output means displays a plurality of candidate face images based on the plurality of generated face image information, on a display screen of a display means, the face image processing system further comprises an input means which accepts one of a selection instruction of a desired candidate face image designated by a user and a determination instruction of a final candidate face image from the plurality of displayed candidate face images, and a computing means which, when the input means accepts the selection instruction of the candidate face image, sets a parameter of each processing of the component extracting means, the removal rate adjusting means and the face color processing means based on the face image information indicating the selected candidate face image by interactive evolutionary computation by performing crossover processing and mutation processing based on a genetic algorithm, and the component extracting means, the removal rate adjusting means and the face color processing means repeatedly generate the face image information based on the parameter set by the computing means until the input means accepts the determination instruction of the candidate face image.

15. The face image processing system according to claim 11, wherein a plurality of the face image information outputted from the output means is generated, the output means displays a plurality of candidate face images based on the plurality of generated face image information, on a display screen of a display means, the face image processing system further comprises an input means which accepts one of a selection instruction of a desired candidate face image designated by a user and a determination instruction of a final candidate face image from the plurality of displayed candidate face images, and a computing means which, when the input means accepts the selection instruction of the candidate face image, sets a parameter of each processing of the component extracting means, the removal rate adjusting means and the face color processing means based on the face image information indicating the selected candidate face image by interactive evolutionary computation by performing crossover processing and mutation processing based on a genetic algorithm, and the component extracting means, the removal rate adjusting means and the face color processing means repeatedly generate the face image information based on the parameter set by the computing means until the input means accepts the determination instruction of the candidate face image.

16. The face image processing system according to claim 12, wherein a plurality of the face image information outputted from the output means is generated, the output means displays a plurality of candidate face images based on the plurality of generated face image information, on a display screen of a display means, the face image processing system further comprises an input means which accepts one of a selection instruction of a desired candidate face image designated by a user and a determination instruction of a final candidate face image from the plurality of displayed candidate face images, and a computing means which, when the input means accepts the selection instruction of the candidate face image, sets a parameter of each processing of the component extracting means, the removal rate adjusting means and the face color processing means based on the face image information indicating the selected candidate face image by interactive evolutionary computation by performing crossover processing and mutation processing based on a genetic algorithm, and the component extracting means, the removal rate adjusting means and the face color processing means repeatedly generate the face image information based on the parameter set by the computing means until the input means accepts the determination instruction of the candidate face image.

17. The face image processing system according to claim 13, wherein, when the input means accepts the determination instruction of the candidate face image, the storage means stores as a reference parameter the parameter for generating the face image information indicating a determined candidate face image.

18. The face image processing system according to claim 14, wherein, when the input means accepts the determination instruction of the candidate face image, the storage means stores as a reference parameter the parameter for generating the face image information indicating a determined candidate face image.

19. The face image processing system according to claim 15, wherein, when the input means accepts the determination instruction of the candidate face image, the storage means stores as a reference parameter the parameter for generating the face image information indicating a determined candidate face image.

20. A face image processing method of a face image processing system comprising: a component extracting means; a removal rate adjusting means; a storage means; a synthesizing means; and an output means, the face image processing method comprising:

extracting a wrinkle component, a fleck component and a pore component of a face image from face image information indicating an inputted face image by the component extracting means;

adjusting a removal rate of each of the extracted wrinkle component, fleck component and pore component by the removal rate adjusting means;

storing the removal rate by the storage means;

synthesizing the wrinkle component, the fleck component and the pore component which are amplified or attenuated at the removal rate adjusted in the step of adjusting the removal rate, and generating the face image by the synthesizing means; and outputting the synthesized face image information by the output means.

* * * * *